United States Patent
He et al.

(10) Patent No.: US 10,771,928 B2
(45) Date of Patent: Sep. 8, 2020

(54) COMMUNICATION METHOD FOR REQUESTING RELAY SERVICE, DEVICE, AND SYSTEM

(71) Applicant: Huawei Technologies Co., Ltd., Shenzhen (CN)

(72) Inventors: Yue He, Beijing (CN); Hui Jin, Beijing (CN); Qiang Yi, Beijing (CN); Guowei Ouyang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 153 days.

(21) Appl. No.: 15/720,602

(22) Filed: Sep. 29, 2017

(65) Prior Publication Data

US 2018/0027390 A1    Jan. 25, 2018

Related U.S. Application Data

(63) Continuation of application No. PCT/CN2015/075386, filed on Mar. 30, 2015.

(51) Int. Cl.
*H04W 4/06* (2009.01)
*H04W 40/22* (2009.01)
(Continued)

(52) U.S. Cl.
CPC ............ *H04W 4/06* (2013.01); *H04W 40/22* (2013.01); *H04W 72/005* (2013.01);
(Continued)

(58) Field of Classification Search
CPC ......... H04W 4/06; H04W 4/02; H04W 40/22; H04W 72/005; H04W 72/0406;
(Continued)

(56) References Cited

U.S. PATENT DOCUMENTS

2007/0124774 A1* 5/2007 Roberts ............. H04W 52/0216
725/62
2013/0051301 A1* 2/2013 Xu ...................... H04W 72/005
370/312
(Continued)

FOREIGN PATENT DOCUMENTS

CN    102026101 A    4/2011
CN    102083006 A    6/2011
(Continued)

OTHER PUBLICATIONS

QUALCOMM Incorporated, "ProSe UE-to-Network Relays," SA WG2 Meeting #98, S2-132455, Valencia, Spain, Jul. 15-19, 2013, 9 pages.
(Continued)

*Primary Examiner* — Un C Cho
*Assistant Examiner* — Rasha K Fayed
(74) *Attorney, Agent, or Firm* — Slater Matsil, LLP

(57) ABSTRACT

Embodiments of the present disclosure provide a communication method for requesting a relay service, comprising: obtaining a first MBMS SAI set, where the first MBMS SAI set is an MBMS SAI set of an MBMS service area of a first MBMS; receiving a second MBMS SAI set sent by second user equipment, where the second MBMS SAI set is an MBMS SAI set to which a camping cell of the second user equipment belongs; and sending a first request message to the second user equipment when the first MBMS SAI set includes at least one SAI in the second MBMS SAI set, where the first request message is used to request the second user equipment to provide the first user equipment with a relay service for the first MBMS.

12 Claims, 8 Drawing Sheets

(51) Int. Cl.
*H04W 72/00* (2009.01)
*H04W 72/04* (2009.01)
*H04W 88/04* (2009.01)
*H04W 76/40* (2018.01)
*H04W 72/14* (2009.01)

(52) U.S. Cl.
CPC ....... *H04W 72/0406* (2013.01); *H04W 88/04* (2013.01); *H04W 72/14* (2013.01); *H04W 76/40* (2018.02)

(58) Field of Classification Search
CPC . H04W 72/14; H04W 72/0453; H04W 76/40; H04W 76/046; H04W 76/27; H04W 76/28; H04W 88/04; H04W 48/12; H04W 48/20; H04W 36/00; H04W 36/0007; H04W 36/26; H04W 36/0033; H04W 36/02; H04W 36/34; H04W 36/22; H04W 36/0055; H04W 24/08; H04W 68/005; H04W 68/00; H04W 28/0268; H04W 28/0289; H04L 12/18; H04L 12/189; H04B 7/00
See application file for complete search history.

(56) References Cited

U.S. PATENT DOCUMENTS

| | | | |
|---|---|---|---|
| 2013/0286927 A1 | 10/2013 | Jiao | |
| 2013/0294326 A1 | 11/2013 | Jiao et al. | |
| 2014/0056220 A1* | 2/2014 | Poitau | H04W 76/14 370/328 |
| 2014/0177506 A1* | 6/2014 | Korus | H04W 48/12 370/312 |
| 2014/0219159 A1* | 8/2014 | Wang | H04L 12/1863 370/312 |
| 2014/0233452 A1* | 8/2014 | Kim | H04W 36/06 370/312 |
| 2014/0341188 A1 | 11/2014 | Chang et al. | |
| 2015/0036578 A1* | 2/2015 | Wu | H04W 8/005 370/312 |
| 2015/0063193 A1* | 3/2015 | Veerepalli | H04W 48/00 370/312 |
| 2015/0131613 A1* | 5/2015 | Jung | H04W 36/22 370/331 |
| 2015/0382159 A1 | 12/2015 | Kim et al. | |
| 2016/0095022 A1 | 3/2016 | Jin et al. | |
| 2016/0234846 A1* | 8/2016 | Chang | H04W 76/27 |
| 2016/0249183 A1* | 8/2016 | Kim | H04H 20/59 |

FOREIGN PATENT DOCUMENTS

| | | |
|---|---|---|
| KR | 20150008389 A | 1/2015 |
| WO | 2013110326 A1 | 8/2013 |
| WO | 2013111905 A1 | 8/2013 |
| WO | 2014133356 A1 | 9/2014 |
| WO | 2015017189 A1 | 2/2015 |
| WO | 2015035621 A1 | 3/2015 |

OTHER PUBLICATIONS

3rd Generation Partnership Project; Technical Specification Group Services and System Aspects; Study on extended architecture support for Proximity-based services (Release 13), 3GPP TR 23.713 V0.4.0 (Feb. 2015), 59 pages.

3rd Generation Partnership Project;Technical Specification Group Services and System Aspects; Proximity-based services (ProSe); Stage 2 (Release 12), 3GPP TS 23.303 V12.4.0 (Mar. 2015), 63 pages.

3rd Generation Partnership Project; Technical Specification Group Core Network and Terminals; Mobility management based on Dual-Stack Mobile IPv6; Stage 3 (Release 12), 3GPP TS 24.303 V12.0.0 (Sep. 2014), 52 pages.

\* cited by examiner

COMMUNICATION METHOD FOR REQUESTING RELAY SERVICE, DEVICE, AND SYSTEM

CROSS-REFERENCE TO RELATED APPLICATIONS

This application is a continuation of International Application No. PCT/CN2015/075386, filed on Mar. 30, 2015, the disclosure of which is hereby incorporated by reference in its entirety.

TECHNICAL FIELD

The present disclosure relates to the communications field, and in particular, to a communication method for requesting a relay service, a device, and a system.

BACKGROUND

In a multimedia broadcast/multicast service (MBMS), a communication manner in which user equipment (UE) accesses a network by using a relay service provided by another user equipment is referred to as relay-based communication. The user equipment that needs the relay service is referred to as remote user equipment (Remote UE), and the user equipment that provides the relay service is referred to as relay user equipment (Relay UE). For example, the remote user equipment is public safety (Public Safety) user equipment that is not in a network coverage area, and the relay user equipment is public safety user equipment that is in a network coverage area. In this case, though not in a network coverage area, the remote user equipment may still receive service data of an MBMS by using a relay service provided by the relay user equipment. Specifically, the remote user equipment requests a relay service from the relay user equipment to obtain service data of an MBMS. After receiving the request, the relay user equipment monitors the service data of the MBMS requested by the remote user equipment, and sends the service data to the remote user equipment if the service data of the MBMS is detected.

In existing relay-based communication, relay user equipment probably cannot provide a relay service for remote user equipment. For example, an MBMS required by the remote user equipment may not be provided in a cell on which the relay user equipment camps. In this case, if no service data of the MBMS exists in the cell on which the relay user equipment camps, the relay user equipment cannot detect the service data of the MBMS. However, the relay user equipment still performs monitoring, and the remote user equipment still waits to receive the service data of the MBMS from the relay user equipment. The remote user equipment may still not receive the service data of the required MBMS from the relay user equipment after waiting, thereby causing a waste of communications resources and low service efficiency for the remote user equipment. It can be learned that in the relay-based communication manner in the prior art, remote user equipment randomly selects relay user equipment, thereby causing a waste of communications resources and device energy, low service efficiency for the remote user equipment, and other problems. Consequently, user satisfaction with a service is seriously affected.

SUMMARY

Embodiments of the present disclosure provide a communication method for requesting a relay service, a device, and a system, so as to avoid randomly selecting relay user equipment, enhance service efficiency for remote user equipment, and improve user satisfaction with a service.

To achieve the foregoing objective, the following technical solutions are used in the embodiments of the present disclosure.

According to a first aspect, a communication method for requesting a relay service is provided and applied to first user equipment. The method includes obtaining a first multimedia broadcast/multicast service service area identity MBMS SAI set, where the first MBMS SAI set is an MBMS SAI set of an MBMS service area of a first multimedia broadcast/multicast service MBMS, and the first MBMS is an MBMS provided by a group communication application server for the first user equipment. The method also includes receiving a second MBMS SAI set sent by second user equipment, where the second MBMS SAI set is an MBMS SAI set to which a camping cell of the second user equipment belongs. The method also includes sending a first request message to the second user equipment when the first MBMS SAI set includes at least one SAI in the second MBMS SAI set, where the first request message is used to request the second user equipment to provide the first user equipment with a relay service for the first MBMS.

With reference to the first aspect, in a first possible implementation manner, obtaining, by the first user equipment, user service description USD of the first user equipment from the group communication application server, where the USD of the first user equipment includes description information of the MBMS provided by the group communication application server for the first user equipment; and using an SAI set that is in the USD of the first user equipment and corresponding to a first temporary mobile group identity TMGI as the first MBMS SAI set, where the first TMGI is used to identify the first MBMS.

With reference to the first possible implementation manner of the first aspect, in a second possible implementation manner, the first request message is a TMGI monitoring request message, and the TMGI monitoring request message includes the first TMGI.

With reference to the first aspect, in a third possible implementation manner, before the receiving a second MBMS SAI set sent by second user equipment, the method further includes: sending a second request message to the second user equipment, where the second request message is used to request to obtain the second MBMS SAI set.

With reference to the first aspect, in a fourth possible implementation manner, after the sending a first request message to the second user equipment, the method further includes: receiving a first response message from the second user equipment, where the first response message is used to instruct the first user equipment to receive service data of the first MBMS from the second user equipment.

According to a second aspect, a communication method for requesting a relay service is provided and applied to second user equipment. The method includes sending a second multimedia broadcast/multicast service service area identity MBMS SAI set to first user equipment, so that the first user equipment determines, according to the second MBMS SAI set and a first MBMS SAI set, whether the second user equipment can provide the first user equipment with a relay service for a first multimedia broadcast/multicast service MBMS, where the second MBMS SAI set is an MBMS SAI set to which a camping cell of the second user equipment belongs, the first MBMS SAI set is an MBMS SAI set of an MBMS service area of the first MBMS, and the first MBMS is an MBMS provided by a group communication application server for the first user equipment. The method also includes receiving a first request message sent by the first user equipment, where the first request message is used to request the second user equipment to provide the first user equipment with the relay service for the first MBMS.

With reference to the second aspect, in a first possible implementation manner, before the sending a second MBMS SAI set to first user equipment, the method further includes: obtaining the second MBMS SAI set from a system information block SIB15 of the camping cell of the second user equipment.

With reference to the second aspect, in a second possible implementation manner, before the sending a second MBMS SAI set to first user equipment, the method further includes: receiving a second request message sent by the first user equipment, where the second request message is used to request to obtain the second MBMS SAI set.

With reference to the second aspect, in a third possible implementation manner, after the receiving a first request message sent by the first user equipment, the method further includes: sending a first response message to the first user equipment, where the first response message is used to instruct the first user equipment to receive service data of the first MBMS from the second user equipment.

According to a third aspect, a communication method for requesting a relay service is provided and applied to second user equipment. The method includes receiving a third request message sent by first user equipment, where the third request message includes a first multimedia broadcast/multicast service service area identity MBMS SAI set, the first MBMS SAI set is an MBMS SAI set of an MBMS service area of a first multimedia broadcast/multicast service MBMS, and the first MBMS is an MBMS provided by a group communication application server for the first user equipment. The method also includes obtaining a second MBMS SAI set, where the second MBMS SAI set is an MBMS SAI set to which a camping cell of the second user equipment belongs. The method includes sending a second response message to the first user equipment when the first MBMS SAI set includes at least one SAI in the second MBMS SAI set, where the second response message is used to indicate that the second user equipment can provide the first user equipment with a relay service for the first MBMS.

With reference to the third aspect, in a first possible implementation manner, the obtaining a second MBMS SAI set includes: obtaining the second MBMS SAI set from a system information block SIB15 of the camping cell of the second user equipment.

With reference to the third aspect, in a second possible implementation manner, the second response message includes an intersection set between the first MBMS SAI set and the second MBMS SAI set.

With reference to the third aspect, or the second possible implementation manner of the third aspect, in a third possible implementation manner, after the sending a second response message to the first user equipment, the method further includes: receiving a first request message sent by the first user equipment, where the first request message is used to request the second user equipment to provide the first user equipment with the relay service for the first MBMS; and sending a first response message to the first user equipment, where the first response message is used to instruct the first user equipment to receive service data of the first MBMS from the second user equipment.

With reference to the third possible implementation manner of the third aspect, in a fourth possible implementation manner, the method further includes: the third request message further includes a first TMGI, and the first TMGI is used to identify the first MBMS; and the second response message is further used to instruct the first user equipment to receive service data of the first MBMS from the second user equipment.

According to a fourth aspect, a communication method for requesting a relay service is provided and applied to first user equipment. The method includes obtaining a first multimedia broadcast/multicast service service area identity MBMS SAI set, where the first MBMS SAI set is an MBMS SAI set of an MBMS service area of a first multimedia broadcast/multicast service MBMS, and the first MBMS is an MBMS provided by a group communication application server for the first user equipment. The method also includes sending a third request message to second user equipment, where the third request message includes the first MBMS SAI set. The method also includes receiving a second response message sent by the second user equipment, where the second response message is used to indicate that the second user equipment can provide the first user equipment with a relay service for the first MBMS.

With reference to the fourth aspect, in a first possible implementation manner, the obtaining a first service area identity MBMS SAI set includes: obtaining, by the first user equipment, user service description USD of the first user equipment from the group communication application server, where the USD of the first user equipment includes description information of the MBMS provided by the group communication application server for the first user equipment; and using an SAI set that is in the USD of the first user equipment and corresponding to a first temporary mobile group identity TMGI as the first MBMS SAI set, where the first TMGI is used to identify the first MBMS.

With reference to the fourth aspect, in a second possible implementation manner, the second response message includes an intersection set between the first MBMS SAI set and a second MBMS SAI set, and the second MBMS SAI set is an MBMS SAI set to which a camping cell of the second user equipment belongs.

With reference to the second possible implementation manner of the fourth aspect, in a third possible implementation manner, after the receiving a second response message sent by the second user equipment, the method further includes: sending a first request message to the second user equipment, where the first request message is used to request the second user equipment to provide the first user equipment with the relay service for the first MBMS; and receiving a first response message sent by the second user equipment, where the first response message is used to instruct the first user equipment to receive service data of the first MBMS from the second user equipment.

According to a fifth aspect, user equipment is provided and used as first user equipment. The user equipment includes an obtaining unit, configured to obtain a first multimedia broadcast/multicast service service area identity MBMS SAI set, and send the first MBMS SAI set to a control unit, where the first MBMS SAI set is an MBMS SAI set of an MBMS service area of a first multimedia broadcast/multicast service MBMS, and the first MBMS is an MBMS provided by a group communication application server for the first user equipment. The user equipment also includes a receiving unit, configured to receive a second MBMS SAI set sent by second user equipment, and send the second MBMS SAI set to the control unit, where the second MBMS SAI set is an MBMS SAI set to which a camping cell of the second user equipment belongs. The user equipment also includes a sending unit, configured to send a first request message to the second user equipment when the control unit determines that the first MBMS SAI set includes at least one SAI in the second MBMS SAI set, where the first request message is used to request the second user equipment to provide the first user equipment with a relay service for the first MBMS.

With reference to the fifth aspect, in a first possible implementation manner, the obtaining unit is specifically configured to: obtain user service description USD of the first user equipment from the group communication application server, where the USD of the first user equipment includes description information of the MBMS provided by the group communication application server for the first user equipment; and use an SAI set that is in the USD of the first user equipment and corresponding to a first temporary mobile group identity TMGI as the first MBMS SAI set, where the first TMGI is used to identify the first MBMS.

With reference to the first possible implementation manner of the fifth aspect, in a second possible implementation manner, the first request message is a TMGI monitoring request message, and the TMGI monitoring request message includes the first TMGI.

With reference to the fifth aspect, in a third possible implementation manner, the sending unit is further configured to send a second request message to the second user equipment, where the second request message is used to request to obtain the second MBMS SAI set.

With reference to the fifth aspect, in a fourth possible implementation manner, the receiving unit is further configured to receive a first response message from the second user equipment, where the first response message is used to instruct the first user equipment to receive service data of the first MBMS from the second user equipment.

According to a sixth aspect, user equipment is provided and used as second user equipment. The user equipment includes a sending unit, configured to send a second multimedia broadcast/multicast service service area identity MBMS SAI set to first user equipment, so that the first user equipment determines, according to the second MBMS SAI set and a first MBMS SAI set, whether the second user equipment can provide the first user equipment with a relay service for a first multimedia broadcast/multicast service MBMS, where the second MBMS SAI set is an MBMS SAI set to which a camping cell of the second user equipment belongs, the first MBMS SAI set is an MBMS SAI set of an MBMS service area of the first MBMS, and the first MBMS is an MBMS provided by a group communication application server for the first user equipment. The user equipment also includes a receiving unit, configured to receive a first request message sent by the first user equipment, where the first request message is used to request the second user equipment to provide the first user equipment with the relay service for the first MBMS.

With reference to the sixth aspect, in a first possible implementation manner, the receiving unit is further configured to receive a system information block SIB15 of the camping cell of the second user equipment; and the user equipment further includes an obtaining unit, configured to obtain the second MBMS SAI set from the system information block SIB15 of the camping cell of the second user equipment that is received by the receiving unit.

With reference to the sixth aspect, in a second possible implementation manner, the receiving unit is further configured to receive a second request message sent by the first user equipment, where the second request message is used to request to obtain the second MBMS SAI set.

With reference to the sixth aspect, in a third possible implementation manner, the sending unit is further configured to send a first response message to the first user equipment, where the first response message is used to instruct the first user equipment to receive service data of the first MBMS from the second user equipment.

According to a seventh aspect, user equipment is provided and used as second user equipment. The user equipment includes a receiving unit, configured to receive a third request message sent by first user equipment, and send the third request message to a control unit, where the third request message includes a first multimedia broadcast/multicast service service area identity MBMS SAI set, the first MBMS SAI set is an MBMS SAI set of an MBMS service area of a first multimedia broadcast/multicast service MBMS, and the first MBMS is an MBMS provided by a group communication application server for the first user equipment. The user equipment also includes an obtaining unit, configured to obtain a second MBMS SAI set, and send the second MBMS SAI set to the control unit, where the second MBMS SAI set is an MBMS SAI set to which a camping cell of the second user equipment belongs. The user equipment also includes a sending unit, configured to send a second response message to the first user equipment when the control unit determines that the first MBMS SAI set includes at least one SAI in the second MBMS SAI set, where the second response message is used to indicate that the second user equipment can provide the first user equipment with a relay service for the first MBMS.

With reference to the seventh aspect, in a first possible implementation manner, the receiving unit is further configured to receive a system information block SIB15 of the camping cell of the second user equipment; and the obtaining unit is specifically configured to obtain the second MBMS SAI set from the system information block SIB15 of the camping cell of the second user equipment that is received by the receiving unit.

With reference to the seventh aspect, in a second possible implementation manner, the second response message includes an intersection set between the first MBMS SAI set and the second MBMS SAI set.

With reference to the seventh aspect, or the second possible implementation manner of the seventh aspect, in a third possible implementation manner, the receiving unit is further configured to receive a first request message sent by the first user equipment, where the first request message is used to request the second user equipment to provide the first user equipment with the relay service for the first MBMS; and the sending unit is further configured to send a first response message to the first user equipment, where the first response message is used to instruct the first user equipment to receive service data of the first MBMS from the second user equipment.

With reference to the third possible implementation manner of the seventh aspect, in a fourth possible implementation manner, the third request message further includes a first TMGI, and the first TMGI is used to identify the first MBMS; and the second response message is further used to instruct the first user equipment to receive service data of the first MBMS from the second user equipment.

According to an eighth aspect, user equipment is provided and used as first user equipment. The user equipment includes an obtaining unit, configured to obtain a first multimedia broadcast/multicast service service area identity MBMS SAI set, where the first MBMS SAI set is an MBMS SAI set of an MBMS service area of a first multimedia broadcast/multicast service MBMS, and the first MBMS is an MBMS provided by a group communication application server for the first user equipment. The user equipment also includes a sending unit, configured to send a third request message to second user equipment, where the third request message includes the first MBMS SAI set obtained by the obtaining unit. The user equipment also includes a receiving unit, configured to receive a second response message sent by the second user equipment, where the second response message is used to indicate that the second user equipment can provide the first user equipment with a relay service for the first MBMS.

With reference to the eighth aspect, in a first possible implementation manner, the obtaining unit is specifically configured to: obtain user service description USD of the first user equipment from the group communication application server, where the USD of the first user equipment includes description information of the MBMS provided by the group communication application server for the first user equipment; and use an SAI set that is in the USD of the first user equipment and corresponding to a first temporary mobile group identity TMGI as the first MBMS SAI set, where the first TMGI is used to identify the first MBMS.

With reference to the eighth aspect, in a second possible implementation manner, the second response message includes an intersection set between the first MBMS SAI set and a second MBMS SAI set, and the second MBMS SAI set is an MBMS SAI set to which a camping cell of the second user equipment belongs.

With reference to the second possible implementation manner of the eighth aspect, in a third possible implementation manner, the sending unit is further configured to send a first request message to the second user equipment, where the first request message is used to request the second user equipment to provide the first user equipment with the relay service for the first MBMS; and the receiving unit is further configured to receive a first response message sent by the second user equipment, where the first response message is used to instruct the first user equipment to receive service data of the first MBMS from the second user equipment.

According to a ninth aspect, user equipment is provided and used as first user equipment, including: a processor, a memory, a transmitter, a receiver, and a bus, where the processor, the memory, the transmitter, the receiver, and the memory are connected to each other by using the bus.

The processor is configured to obtain a first multimedia broadcast/multicast service service area identity MBMS SAI set, where the first MBMS SAI set is an MBMS SAI set of an MBMS service area of a first multimedia broadcast/multicast service MBMS, and the first MBMS is an MBMS provided by a group communication application server for the first user equipment.

The receiver is configured to receive a second MBMS SAI set sent by second user equipment, where the second MBMS SAI set is an MBMS SAI set to which a camping cell of the second user equipment belongs.

The transmitter is configured to send a first request message to the second user equipment when the processor determines that the first MBMS SAI set includes at least one SAI in the second MBMS SAI set, where the first request message is used to request the second user equipment to provide the first user equipment with a relay service for the first MBMS.

With reference to the ninth aspect, in a first possible implementation manner, the processor is specifically configured to: obtain user service description USD of the first user equipment from the group communication application server, where the USD of the first user equipment includes description information of the MBMS provided by the group communication application server for the first user equipment; and use an SAI set that is in the USD of the first user equipment and corresponding to a first temporary mobile group identity TMGI as the first MBMS SAI set, where the first TMGI is used to identify the first MBMS.

With reference to the first possible implementation manner of the ninth aspect, in a second possible implementation manner, the first request message is a TMGI monitoring request message, and the TMGI monitoring request message includes the first TMGI.

With reference to the ninth aspect, in a third possible implementation manner, the transmitter is further configured to send a second request message to the second user equipment, where the second request message is used to request to obtain the second MBMS SAI set.

With reference to the ninth aspect, in a fourth possible implementation manner, the receiver is further configured to receive a first response message from the second user equipment, where the first response message is used to instruct the first user equipment to receive service data of the first MBMS from the second user equipment.

According to a tenth aspect, user equipment is provided and used as second user equipment, including: a processor, a memory, a transmitter, a receiver, and a bus, where the processor, the memory, the transmitter, the receiver, and the memory are connected to each other by using the bus.

The transmitter is configured to send a second multimedia broadcast/multicast service service area identity MBMS SAI set to first user equipment, so that the first user equipment determines, according to the second MBMS SAI set and a first MBMS SAI set, whether the second user equipment can provide the first user equipment with a relay service for a first multimedia broadcast/multicast service MBMS, where the second MBMS SAI set is an MBMS SAI set to which a camping cell of the second user equipment belongs, the first MBMS SAI set is an MBMS SAI set of an MBMS service area of the first MBMS, and the first MBMS is an MBMS provided by a group communication application server for the first user equipment.

The receiver is configured to receive a first request message sent by the first user equipment, where the first request message is used to request the second user equipment to provide the first user equipment with the relay service for the first MBMS.

With reference to the tenth aspect, in a first possible implementation manner, the receiver is further configured to receive a system information block SIB15 of the camping cell of the second user equipment; and the processor is configured to obtain the second MBMS SAI set from the system information block SIB15 of the camping cell of the second user equipment that is received by the receiving unit.

With reference to the tenth aspect, in a second possible implementation manner, the receiver is further configured to receive a second request message sent by the first user equipment, where the second request message is used to request to obtain the second MBMS SAI set.

With reference to the tenth aspect, in a third possible implementation manner, the transmitter is further configured to send a first response message to the first user equipment, where the first response message is used to instruct the first user equipment to receive service data of the first MBMS from the second user equipment.

According to an eleventh aspect, user equipment is provided and used as second user equipment, including: a processor, a memory, a transmitter, a receiver, and a bus, where the processor, the memory, the transmitter, the receiver, and the memory are connected to each other by using the bus.

The receiver is configured to receive a third request message sent by first user equipment, where the third request message includes a first multimedia broadcast/multicast service service area identity MBMS SAI set, the first MBMS SAI set is an MBMS SAI set of an MBMS service area of a first multimedia broadcast/multicast service MBMS, and the first MBMS is an MBMS provided by a group communication application server for the first user equipment.

The processor is configured to obtain a second MBMS SAI set, where the second MBMS SAI set is an MBMS SAI set to which a camping cell of the second user equipment belongs.

The transmitter is configured to send a second response message to the first user equipment when the processor determines that the first MBMS SAI set includes at least one SAI in the second MBMS SAI set, where the second response message is used to indicate that the second user equipment can provide the first user equipment with a relay service for the first MBMS.

With reference to the eleventh aspect, in a first possible implementation manner, the receiver is further configured to receive a system information block SIB15 of the camping cell of the second user equipment; and the processor is further configured to obtain the second MBMS SAI set from the system information block SIB15 of the camping cell of the second user equipment that is received by the receiver.

With reference to the eleventh aspect, in a second possible implementation manner, the second response message includes an intersection set between the first MBMS SAI set and the second MBMS SAI set.

With reference to the eleventh aspect, or the second possible implementation manner of the eleventh aspect, in a third possible implementation manner, the receiver is further configured to receive a first request message sent by the first user equipment, where the first request message is used to request the second user equipment to provide the first user equipment with the relay service for the first MBMS; and the transmitter is further configured to send a first response message to the first user equipment, where the first response message is used to instruct the first user equipment to receive service data of the first MBMS from the second user equipment.

With reference to the third possible implementation manner of the eleventh aspect, in a fourth possible implementation manner, the third request message further includes a first TMGI, and the first TMGI is used to identify the first MBMS; and the second response message is further used to instruct the first user equipment to receive service data of the first MBMS from the second user equipment.

According to a twelfth aspect, user equipment is provided and used as first user equipment, including: a processor, a memory, a transmitter, a receiver, and a bus, where the processor, the memory, the transmitter, the receiver, and the memory are connected to each other by using the bus.

The processor is configured to obtain a first multimedia broadcast/multicast service service area identity MBMS SAI set, where the first MBMS SAI set is an MBMS SAI set of an MBMS service area of a first multimedia broadcast/multicast service MBMS, and the first MBMS is an MBMS provided by a group communication application server for the first user equipment.

The transmitter is configured to send a third request message to second user equipment, where the third request message includes the first MBMS SAI set obtained by the obtaining unit.

The receiver is configured to receive a second response message sent by the second user equipment, where the second response message is used to indicate that the second user equipment can provide the first user equipment with a relay service for the first MBMS.

With reference to the twelfth aspect, in a first possible implementation manner, the processor is specifically configured to: obtain user service description USD of the first user equipment from the group communication application server, where the USD of the first user equipment includes description information of the MBMS provided by the group communication application server for the first user equipment; and use an SAI set that is in the USD of the first user equipment and corresponding to a first temporary mobile group identity TMGI as the first MBMS SAI set, where the first TMGI is used to identify the first MBMS.

With reference to the twelfth aspect, in a second possible implementation manner, the second response message includes an intersection set between the first MBMS SAI set and a second MBMS SAI set, and the second MBMS SAI set is an MBMS SAI set to which a camping cell of the second user equipment belongs.

With reference to the second possible implementation manner of the twelfth aspect, in a third possible implementation manner, the transmitter is further configured to send a first request message to the second user equipment, where the first request message is used to request the second user equipment to provide the first user equipment with the relay service for the first MBMS; and the receiver is further configured to receive a first response message sent by the second user equipment, where the first response message is used to instruct the first user equipment to receive service data of the first MBMS from the second user equipment.

According to a thirteenth aspect, a communications system is provided. The system includes first user equipment and second user equipment. The first user equipment is the user equipment described in any one of the fifth aspect, or the first to the fourth possible implementation manners of the fifth aspect, and the second user equipment is the user equipment described in any one of the sixth aspect, or the first to the third possible implementation manners of the sixth aspect; or the first user equipment is the user equipment described in any one of the eighth aspect, or the first to the third possible implementation manners of the eighth aspect, and the second user equipment is the user equipment described in any one of the seventh aspect, or the first to the fourth possible implementation manners of the seventh aspect; or the first user equipment is the user equipment described in any one of the ninth aspect, or the first to the fourth possible implementation manners of the ninth aspect, and the second user equipment is the user equipment described in any one of the tenth aspect, or the first to the third possible implementation manners of the tenth aspect; or the first user equipment is the user equipment described in any one of the twelfth aspect, or the first to the third possible implementation manners of the twelfth aspect, and the second user equipment is the user equipment described in any one of the eleventh aspect, or the first to the fourth possible implementation manners of the eleventh aspect.

According to the communication method for requesting a relay service, the device, and the system that are provided in the embodiments of the present disclosure, first user equipment or second user equipment compares a first MBMS SAI set with a second MBMS SAI set, and when the first MBMS SAI set includes at least one SAI in the second MBMS SAI set, determines that the second user equipment can be used as relay user equipment to provide the first user equipment with a relay service for a first MBMS.

The first MBMS SAI set is an MBMS SAI set of an MBMS service area of a first multimedia broadcast/multicast service MBMS, and the second MBMS SAI set is an MBMS SAI set to which a camping cell of the second user equipment belongs. If the first MBMS SAI set includes at least one SAI in the second MBMS SAI set, it means that the camping cell of the second user equipment belongs to the MBMS service area of the first MBMS, that is, the camping cell of the second user equipment is within coverage of the MBMS service area of the first MBMS. In this case, the camping cell of the second user equipment provides the first MBMS.

The first user equipment requests the relay service from the second user equipment after determining that the second user equipment can be used as relay user equipment. In this way, randomly selecting relay user equipment is avoided, and the first user equipment can select appropriate relay user equipment that provides the relay service for the first MBMS. Therefore, service efficiency for the first user equipment is enhanced, and user satisfaction with a service is improved.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

A communication manner in which user equipment (UE) accesses a network by using a relay service provided by another user equipment is referred to as relay-based communication. In the embodiments of the present disclosure, an MBMS application scenario is used as an example to describe the communication method for requesting a relay service that is provided in the embodiments of the present disclosure. Certainly, the communication method for requesting a relay service that is provided in the embodiments of the present disclosure may be further applied to an evolved multimedia broadcast/multicast service (eMBMS) application scenario or another application scenario. A specific application scenario of the communication method for requesting a relay service is not limited in the present disclosure.

An MBMS supports a broadcast service and a multicast service, and multimedia video information may be directly broadcast to all user equipment, or may be sent to a specific group of user equipment. For example, a free MBMS may be sent to user equipment in a broadcast manner, so that all user equipment can receive the free MBMS. For a paid MBMS, service data is sent, in a multicast manner, only to user equipment that pays.

An MBMS may provide multiple multimedia services. For example, a mobile phone television service is relatively common at present and enables a user to conveniently watch a television program such as news, or a match by using a mobile phone. In the embodiments of the present disclosure, an example in which first user equipment requests a relay service to obtain service data of a first MBMS is used to describe the communication method for requesting a relay service.

Figure 1:
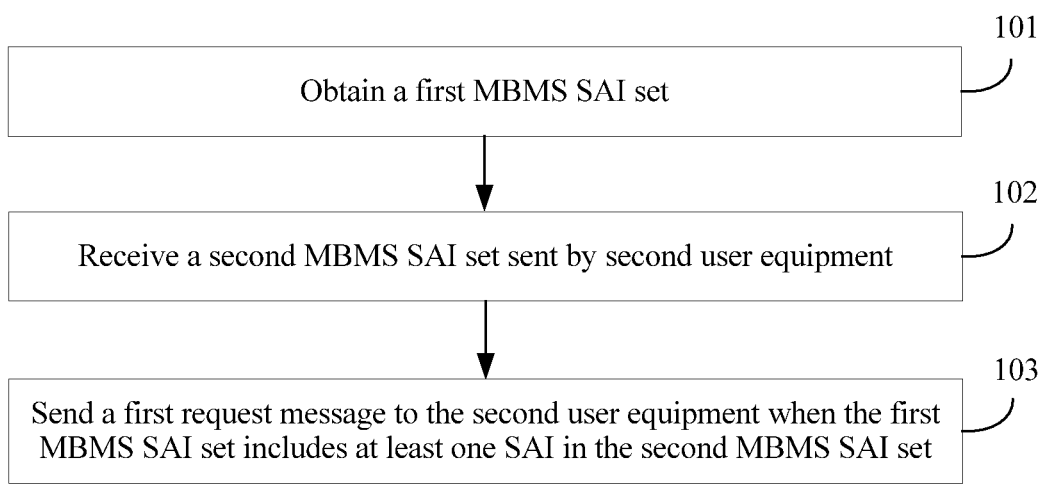
FIG. 1 is a schematic flowchart of a communication method for requesting a relay service according to an embodiment of the present disclosure.

Referring to FIG. 1, an embodiment of the present disclosure provides a method for requesting a relay service. The method is applied to first user equipment, and specifically includes the following steps:

101. Obtain a first MBMS SAI set.

An MBMS service area identity (SAI) is used to identify a service area of an MBMS. The first MBMS SAI set is an MBMS SAI set of an MBMS service area of a first MBMS, and is used to identify the MBMS service area of the first MBMS. The first MBMS is an MBMS provided by a group communication application server for the first user equipment, includes an MBMS to which the first user equipment subscribes, an MBMS actively pushed by the group communication application server to the first user equipment, and the like, and specifically includes various free, paid, and trial MBMSs, and the like.

The first MBMS SAI set may include one or more MBMS SATs, that is, the first MBMS may have one or more MBMS service areas. An MBMS service identified by each MBMS SAI in the first MBMS SAI set can provide the first MBMS for a user.

102. Receive a second MBMS SAI set sent by second user equipment.

The second MBMS SAI set is an MBMS SAI set to which a camping cell of the second user equipment belongs. The second MBMS SAI set may include one or more MBMS SAIs, and it indicates that the camping cell of the second user equipment belongs to one or more MBMS service areas, that is, the camping cell of the second user equipment is within coverage of one or more MBMS service areas.

103. Send a first request message to the second user equipment when the first MBMS SAI set includes at least one SAI in the second MBMS SAI set.

In some cases, for example, when the first user equipment is not in a network coverage area, and cannot directly obtain service data of the first MBMS, the first user equipment may obtain the service data of the first MBMS by requesting a relay service from other user equipment.

In this embodiment, the first user equipment determines, according to the first MBMS SAI set and the second MBMS SAI set that is received from the second user equipment, whether the second user equipment can be used as relay user equipment to provide the first user equipment with a relay service for the first MBMS.

A specific determining manner is: determining whether the first MBMS SAI set includes at least one SAI in the second MBMS SAI set, or determining whether the second MBMS SAI set includes at least one SAI in the first MBMS SAI set.

If the first MBMS SAI set includes at least one SAI in the second MBMS SAI set, it means that there is an intersection set between the first MBMS SAI set and the second MBMS SAI set, that is, the camping cell of the second user equipment belongs to the MBMS service area of the first MBMS, or the camping cell of the second user equipment is within coverage of the MBMS service area of the first MBMS. In this case, the second user equipment can be used as relay user equipment.

The first user equipment sends the first request message to the second user equipment after determining that the second user equipment can provide the relay service. The first request message is used to request the second user equipment to provide the first user equipment with the relay service for the first MBMS.

In the communication method for requesting a relay service according to this embodiment of the present disclosure, first user equipment obtains a first MBMS SAI set and a second MBMS SAI set, and when determining that a camping cell of second user equipment is within coverage of an MBMS service area of a first MBMS, requests the second user equipment to provide the first user equipment with a relay service for the first MBMS. In this way, randomly selecting relay user equipment by the first user equipment is avoided, and the first user equipment can select appropriate relay user equipment that provides the relay service for the first MBMS. Therefore, service efficiency for the first user equipment is enhanced, and user satisfaction with a service is improved.

Figure 2:
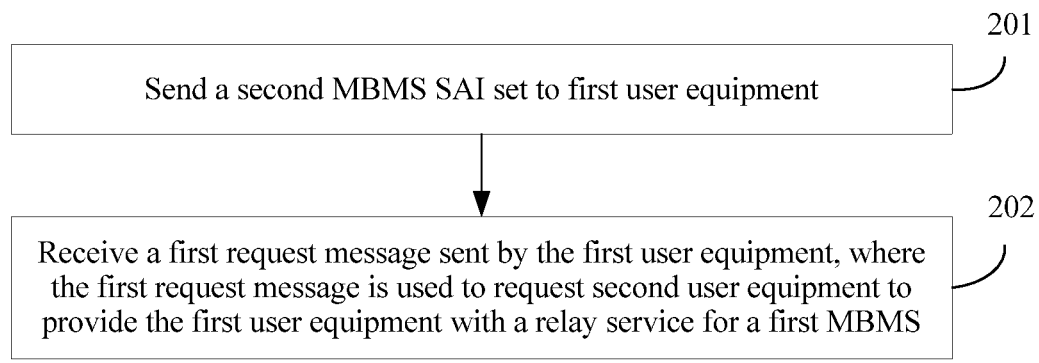
FIG. 2 is a schematic flowchart of another communication method for requesting a relay service according to an embodiment of the present disclosure.

With reference to the embodiment corresponding to FIG. 1, an embodiment of the present disclosure provides another communication method for requesting a relay service. Referring to FIG. 2, the method is applied to second user equipment, and specifically includes the following steps.

201. Send a second MBMS SAI set to first user equipment.

The second MBMS SAI set is an MBMS SAI set to which a camping cell of the second user equipment belongs.

In this embodiment, the first user equipment needs to determine, according to a first MBMS SAI set and the second MBMS SAI set, whether the second user equipment can provide a relay service for a first MBMS. Therefore, the second user equipment sends the second MBMS SAI set to the first user equipment, so that the first user equipment determines whether to request the relay service from the second user equipment. The first MBMS is an MBMS provided by a group communication application server for the first user equipment, and a first MBMS SAI is used to identify an MBMS service area of the first MBMS.

202. Receive a first request message sent by the first user equipment, where the first request message is used to request the second user equipment to provide the first user equipment with a relay service for a first MBMS.

When the second user equipment receives the first request message sent by the first user equipment, it indicates that the first user equipment has determined that the second user equipment can provide the relay service for the first MBMS, and requests the relay service from the second user equipment.

In the communication method for requesting a relay service according to this embodiment of the present disclosure, second user equipment sends a second MBMS SAI set to first user equipment, so that the first user equipment requests a relay service for a first MBMS from the second user equipment after determining that the second user equipment can be used as relay user equipment. In this way, randomly selecting relay user equipment by the first user equipment is avoided, and the first user equipment can select appropriate relay user equipment that provides the relay service for the first MBMS. Therefore, service efficiency for the first user equipment is enhanced, and user satisfaction with a service is improved.

Figure 3:
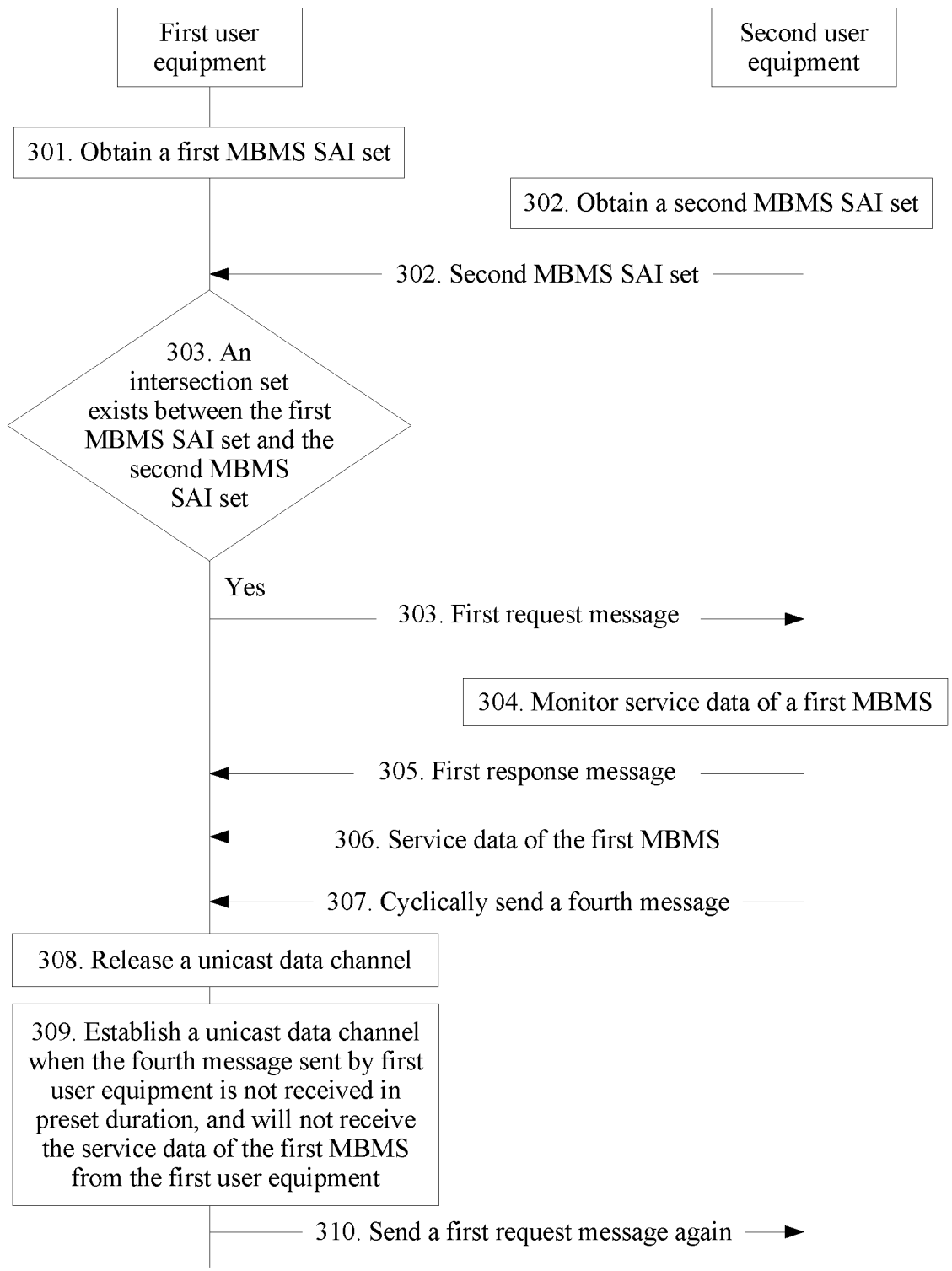
FIG. 3 is a schematic flowchart of still another communication method for requesting a relay service according to an embodiment of the present disclosure.

Based on the embodiments corresponding to FIG. 1 and FIG. 2, an embodiment of the present disclosure provides still another communication method for requesting a relay service. Referring to FIG. 3, the method specifically includes the following steps.

301. First user equipment obtains a first MBMS SAI set.

The first MBMS SAI set is an MBMS SAI set of an MBMS service area of a first MBMS, and is used to identify the MBMS service area of the first MBMS. The first MBMS may be any MBMS provided by a group communication application server for the first user equipment.

Optionally, the first user equipment obtains user service description (USD) of the first user equipment from the group communication application server by accessing the group communication application server, and obtains the first MBMS SAI set from the USD of the first user equipment. The USD of the first user equipment includes description information of the MBMS provided by the group communication application server for the first user equipment.

Specifically, the group communication application server provides one or more MBMSs for the first user equipment.

In the USD of the first user equipment, different MBMSs are identified by using different temporary mobile group identities (TMGI), that is, one MBMS corresponds to one TMGI. Further, one TMGI corresponds to one or more SAIs, and one SAI identifies one MBMS service area. After obtaining the USD, the first user equipment uses an SAI that is in the USD and corresponding to a first TMGI as the first MBMS SAI set, and the first TMGI is a TMGI that identifies the first MBMS.

In the foregoing process of accessing the group communication application server by the first user equipment to obtain the USD, the first user equipment may directly access the group communication application server to obtain the USD of the first user equipment from the group communication application server, or may access the group communication application server by using second user equipment, and obtain the USD of the first user equipment from the group communication application server. For example, the first user equipment within a network coverage area directly accesses the group communication application server to obtain and store the USD. The first user equipment outside a network coverage area may access a network by using the second user equipment, and access the group communication application server by using the second user equipment.

302. Second user equipment obtains a second MBMS SAI set, and sends the second MBMS SAI set to the first user equipment.

The second MBMS SAI set is an MBMS SAI set to which a camping cell of the second user equipment belongs.

The second user equipment may obtain a second MBMS SAI from a system information block (SIB) 15 of the camping cell of the second user equipment.

The SIB15 includes a list of MBMS SATs for the current frequency (List of MBMS SAIs for the Current Frequency) of the camping cell of the second user equipment. Each SAI in the list identifies an MBMS service area to which the camping cell of the second user equipment belongs. After receiving and parsing the SIB15, the second user equipment uses SAIs in the list as the second MBMS SAI set.

The second user equipment broadcasts the second MBMS SAI set after obtaining the second MBMS SAI set. The first user equipment receives the second MBMS SAI set by receiving a broadcast of the second user equipment.

Alternatively, the first user equipment sends a request to the second user equipment to obtain the second MBMS SAI set. Specifically, the first user equipment sends a second request message to the second user equipment, and the second request message is used to request to obtain the second MBMS SAI set. After receiving the second request message, the second user equipment obtains the second MBMS SAI set from the system information block SIB15 of the camping cell of the second user equipment, and sends the second MBMS SAI set to the first user equipment.

303. The first user equipment sends a first request message to the second user equipment when the first MBMS SAI set includes at least one SAI in the second MBMS SAI set.

The first request message is used to request the second user equipment to provide the first user equipment with a relay service for the first MBMS.

If the first MBMS SAI set includes at least one SAI in the second MBMS SAI set, that is, there is an intersection set between the first MBMS SAI set and the second MBMS SAI set, it indicates that the camping cell of the second user equipment belongs to the MBMS service area of the first MBMS, that is, the camping cell of the second user equipment provides the first MBMS. Therefore, the second user equipment can be used as relay user equipment to provide the first user equipment with the relay service for the first MBMS.

If the first MBMS SAI set does not include any SAI in the second MBMS SAI set, that is, there is no intersection set between the first MBMS SAI set and the second MBMS SAI set, it means that the second user equipment cannot be used as relay user equipment. In this case, subsequent steps are not performed.

The first user equipment sends the first request message to the second user equipment after determining that the second user equipment can be used as relay user equipment, so as to request the second user equipment to provide the first user equipment with the relay service for the first MBMS. Optionally, the first request message may be a TMGI monitoring request message, and the TMGI monitoring request message includes the first TMGI. The first TMGI is used to identify the first MBMS.

304. The second user equipment monitors service data of a first MBMS.

After receiving the first request message, the second user equipment is triggered to monitor the service data of the first MBMS. Specifically, when detecting the first TMGI on a multicast control channel (MCCH), the second user equipment receives the service data of the first MBMS on an MBMS traffic channel (MTCH).

For a cell that provides the first MBMS, that is, a cell within coverage of the MBMS service area of the first MBMS, the first TMGI can be detected on the MCCH only when there is service data of the first MBMS on the MTCH. If there is no service data of the first MBMS on the MTCH, the first TMGI cannot be detected on the MCCH. Therefore, whether a cell can provide the first MBMS cannot be determined only according to whether the first TMGI can be detected on the MCCH.

In this embodiment of the present disclosure, whether the camping cell of the second user equipment provides the first MBMS is determined according to the first MBMS SAI set and the second MBMS SAI set, so as to more accurately determine whether the second user equipment can be used as relay user equipment to provide the first user equipment with the relay service for the first MBMS.

305. The second user equipment sends a first response message to the first user equipment.

With reference to step 303, after receiving the first request message, the second user equipment sends the first response message to the first user equipment, and the first response message is used to instruct the first user equipment to receive the service data of the first MBMS from the second user equipment. Specifically, the first response message may be a TMGI monitoring response message, and the TMGI monitoring response message includes a Media Access Control (MAC) address, which is used as a layer-2 identity (layer-2 group ID_traffic) for sending the service data of the first MBMS to the first user equipment. In addition, the TMGI monitoring response message further includes monitoring duration (TMGI_monitoring_refresh timer), and the monitoring duration is duration in which the second user equipment monitors the service data of the first MBMS. The second user equipment stops the monitoring when a monitoring time of the second user equipment exceeds the monitoring duration.

306. The second user equipment sends the service data of the first MBMS to the first user equipment when detecting the service data of the first MBMS.

Specifically, when detecting the service data of the first MBMS, the second user equipment sends the service data of the first MBMS to the first user equipment by using the MAC address carried in the TMGI monitoring response message. Because the first user equipment has obtained the MAC address by using the TMGI monitoring response message, the first user equipment may identify, according to the MAC address, the service data of the first MBMS that is sent by the second user equipment.

The first user equipment may receive the service data of the first MBMS from the second user equipment by using the relay service that is for the first MBMS and that is provided by the second user equipment. Before sending the first request message to the second user equipment, the first user equipment has determined that the camping cell of the second user equipment is in the MBMS service area of the first MBMS, that is, the first user equipment has determined that the second user equipment can provide the relay service. Therefore, the following prior-art problems are avoided: The first user equipment cannot receive the service data of the first MBMS in a timely manner due to random selection of relay user equipment, and communications resources are wasted due to continuous monitoring and waiting.

307. The second user equipment cyclically sends a fourth message to the first user equipment.

With reference to step 304, when monitoring the service data of the first MBMS, the second user equipment cyclically sends the fourth message to the first user equipment. The fourth message includes the first TMGI. The fourth message is used to indicate that the second user equipment is monitoring the service data of the first MBMS. Optionally, the second user equipment cyclically sends the fourth message in a broadcast manner, so that the first user equipment receives the fourth message.

Step 305, step 306, and step 307 are all performed after step 304, and there is no sequence among the three steps.

308. The first user equipment releases a unicast data channel.

With reference to step 307, after receiving the fourth message, the first user equipment determines that the service data of the first MBMS can be received by using the second user equipment. In this case, the first user equipment releases the unicast data channel. The unicast data channel is a unicast data channel on which the application server of the first MBMS sends the service data of the first MBMS to the first user equipment. Replacing the unicast data channel with an MBMS broadcast/multicast data channel helps save communications resources and improve communication efficiency.

309. When the first user equipment does not receive, in preset duration, the fourth message sent by the second user equipment, the first user equipment requests an application server of the first MBMS to establish a unicast data channel, and will not receive the service data of the first MBMS from the second user equipment.

If the first user equipment does not receive the fourth message in the preset duration, it indicates that the first user equipment cannot receive the service data of the first MBMS by using the second user equipment. In this case, the first user equipment may request to establish the unicast data channel. After the unicast data channel is established, the first user equipment can receive the service data of the first MBMS by using the unicast data channel, and will not receive the service data of the first MBMS from the second user equipment.

310. After monitoring duration elapses, the first user equipment sends a first request message to the second user equipment again.

With reference to step 305, the second user equipment stops the monitoring when the monitoring time of the second user equipment exceeds the monitoring duration. Therefore, if the first user equipment still needs the second user equipment to provide the relay service after receiving the first response message sent by the second user equipment and the monitoring duration elapses, the first user equipment sends the first request message to the second user equipment again, so as to request the second user equipment to continues to monitor the service data of the first MBMS.

In the communication method for requesting a relay service according to this embodiment of the present disclosure, first user equipment obtains a first MBMS SAI set, second user equipment obtains s second MBMS SAI set and sends the second MBMS SAI set to the first user equipment, and the first user equipment determines whether the second user equipment can be used as relay user equipment to provide the first user equipment with a relay service for a first MBMS. If the second user equipment can be used as relay user equipment, the first user equipment sends a first request message to the second user equipment, and further receives service data of the first MBMS by using the second user equipment. If the second user equipment cannot be used as relay user equipment, there is no need to request the relay service from the second user equipment. In this way, randomly selecting relay user equipment by the first user equipment is avoided, and the first user equipment can select appropriate relay user equipment that provides the relay service for the first MBMS. Therefore, service efficiency for the first user equipment is enhanced, and user satisfaction with a service is improved.

Figure 4:
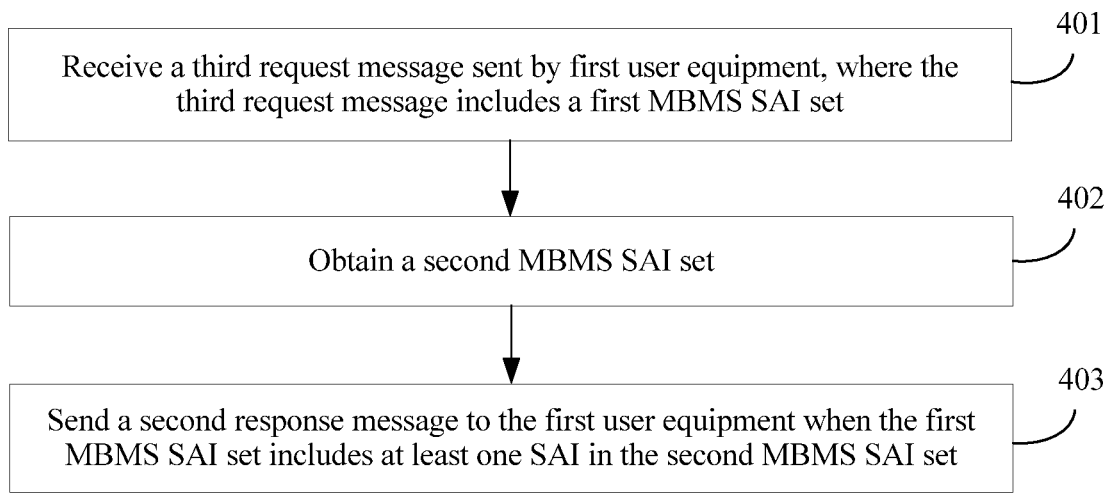
FIG. 4 is a schematic flowchart of a communication method for requesting a relay service according to another embodiment of the present disclosure.

Another embodiment of the present disclosure provides another communication method for requesting a relay service. Referring to FIG. 4, the method is applied to second user equipment, and specifically includes the following steps.

401. Receive a third request message sent by first user equipment, where the third request message includes a first MBMS SAI set.

The first MBMS SAI set is an MBMS SAI set of an MBMS service area of a first MBMS, and is used to identify the MBMS service area of the first MBMS. The first MBMS is an MBMS provided by a group communication application server for the first user equipment.

The first MBMS SAI set may include one or more MBMS SATs, and an MBMS service area identified by each SAI in the first MBMS SAI set can provide the first MBMS for a user.

402. Obtain a Second MBMS SAI Set.

The second MBMS SAI set is an MBMS SAI set to which a camping cell of the second user equipment belongs.

Specifically, the second user equipment may obtain a second MBMS SAI from a SIB 15 of the camping cell of the second user equipment.

The SIB15 includes a list of MBMS SATs for the current frequency (List of MBMS SAIs for the Current Frequeny) of the camping cell of the second user equipment. Each SAI in the list identifies an MBMS service area to which the camping cell of the second user equipment belongs. After receiving and parsing the SIB15, the second user equipment uses SAIs in the list as the second MBMS SAI set.

403. Send a second response message to the first user equipment when the first MBMS SAI set includes at least one SAI in the second MBMS SAI set.

The second response message is used to indicate that the second user equipment can provide the first user equipment with a relay service for the first MBMS.

If the first MBMS SAI set includes at least one SAI in the second MBMS SAI set, that is, there is an intersection set between the first MBMS SAI set and the second MBMS SAI set, it indicates that the camping cell of the second user equipment belongs to the MBMS service area of the first MBMS. Therefore, the second user equipment can be used as relay user equipment to provide the first user equipment with the relay service for the first MBMS. In this case, the second user equipment sends the second response message to the first user equipment.

If there is no intersection set between the first MBMS SAI set and the second MBMS SAI set, the second user equipment does not send the second response message to the first user equipment. For example, the second user equipment does not respond to the third request message, or sends a message for refusing to provide the relay service.

In the communication method for requesting a relay service according to this embodiment of the present disclosure, the second user equipment receives a third request message that includes a first MBMS SAI set and that is sent by first user equipment, obtains a second MBMS SAI set from a system information block SIB15 of a camping cell of the second user equipment, and when the first MBMS SAI set includes at least one SAI in the second MBMS SAI set, notifies, by using a second response message, the first user equipment that the second user equipment can provide the first user equipment with a relay service for a first MBMS. In this way, randomly selecting relay user equipment by the first user equipment is avoided, and the first user equipment can select appropriate relay user equipment that provides the relay service for the first MBMS. Therefore, service efficiency for the first user equipment is enhanced, and user satisfaction with a service is improved.

Figure 5:
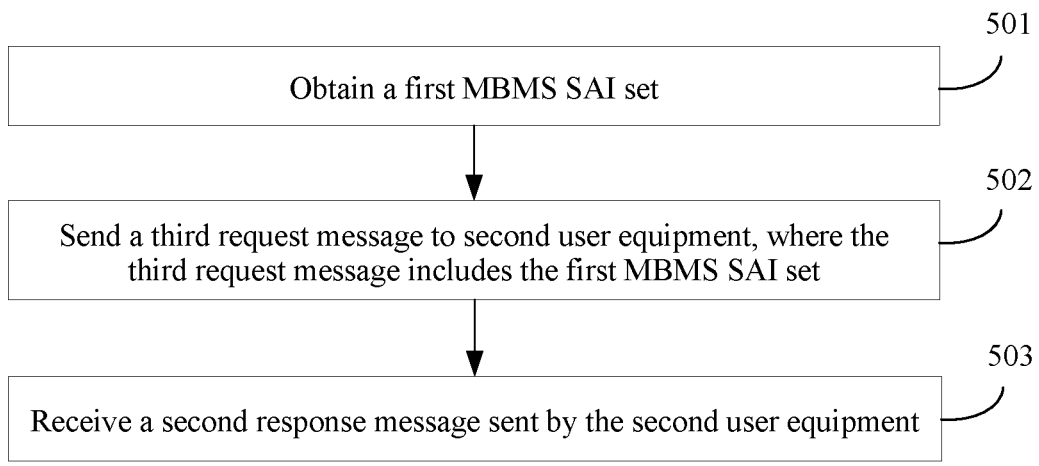
FIG. 5 is a schematic flowchart of another communication method for requesting a relay service according to another embodiment of the present disclosure.

Another embodiment of the present disclosure provides a communication method for requesting a relay service. Referring to FIG. 5, the method is applied to first UE, and specifically includes the following steps.

501. Obtain a First MBMS SAI Set.

The first MBMS SAI set is an MBMS SAI set of an MBMS service area of a first MBMS, and is used to identify the MBMS service area of the first MBMS. The first MBMS is an MBMS provided by a group communication application server for the first user equipment.

Specifically, optionally, the first user equipment obtains USD of the first user equipment from the group communication application server by accessing the group communication application server, and uses an SAI that is in the USD and corresponding to a first TMGI as the first MBMS SAI set, and the first TMGI is a TMGI that identifies the first MBMS.

502. Send a third request message to second user equipment, where the third request message includes the first MBMS SAI set.

503. Receive a second response message sent by the second user equipment.

The second response message is used to indicate that the second user equipment can provide the first user equipment with a relay service for the first MBMS.

When receiving the second response message sent by the second user equipment, the first user equipment determines that the second user equipment can provide the relay service.

In the communication method for requesting a relay service according to this embodiment of the present disclosure, first user equipment obtains a first MBMS SAI set, and sends the first MBMS SAI set to second user equipment, so that the second user equipment determines whether the second user equipment can provide the first user equipment with a relay service for a first MBMS. In this way, randomly selecting relay user equipment is avoided, and the first user equipment can select appropriate relay user equipment that provides the relay service for the first MBMS. Therefore, service efficiency for the first user equipment is enhanced, and user satisfaction with a service is improved.

Figure 6:
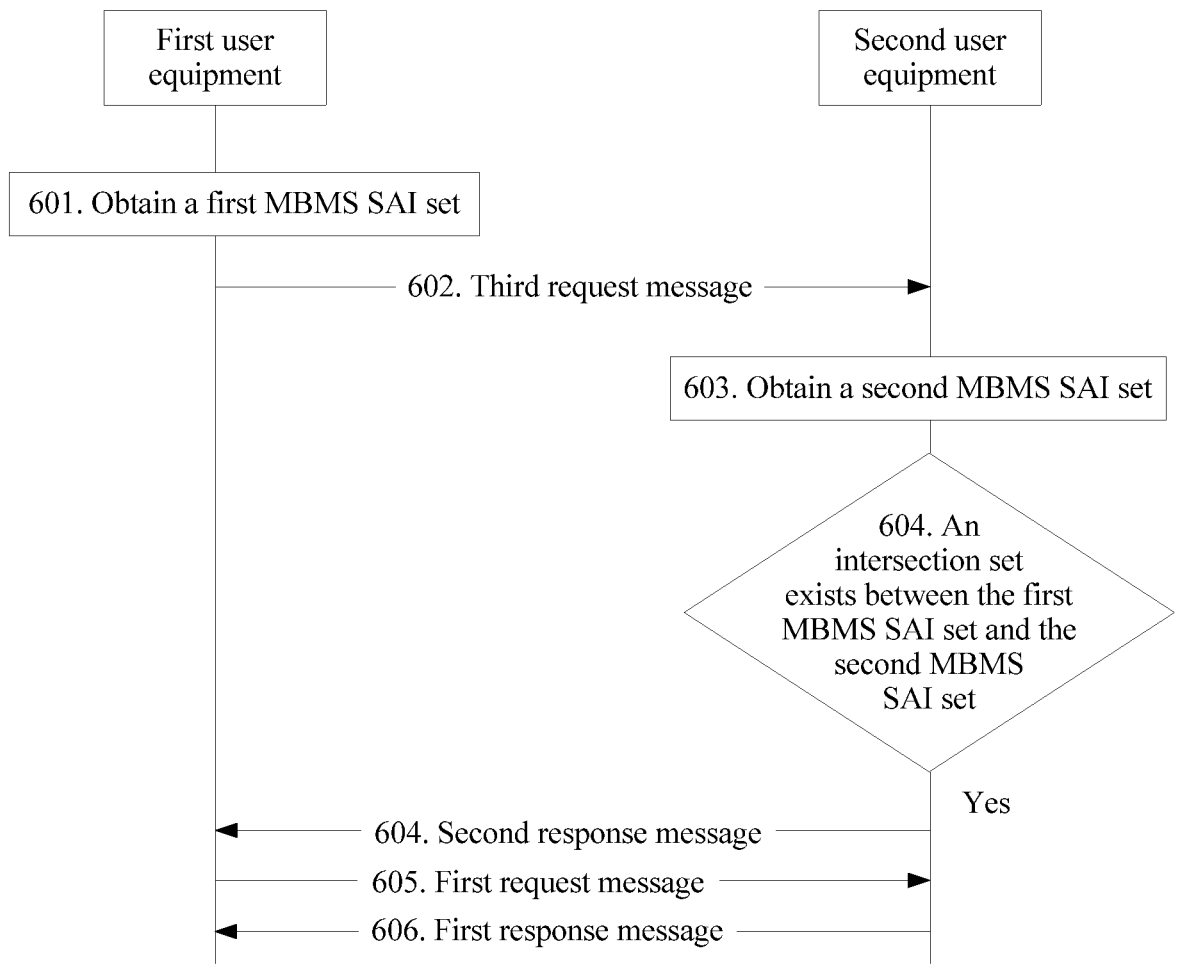
FIG. 6 is a schematic flowchart of still another communication method for requesting a relay service according to another embodiment of the present disclosure.

Based on the embodiments corresponding to FIG. 4 and FIG. 5, another embodiment of the present disclosure provides still another communication method for requesting a relay service. Referring to FIG. 6, the method specifically includes the following steps.

601. First user equipment obtains a first MBMS SAI set.

The first MBMS SAI set is an MBMS SAI set of an MBMS service area of a first MBMS, and is used to identify the MBMS service area of the first MBMS. The first MBMS is an MBMS provided by a group communication application server for the first user equipment.

Specifically, the first user equipment obtains USD of the first user equipment by accessing the group communication application server, and uses an MBMS SAI set that is in the USD and corresponding to a first TMGI as the first MBMS SAI set, and the first TMGI is used to identify the first MBMS.

602. The first user equipment sends a third request message to second user equipment.

The third request message includes the first MBMS SAI set.

603. The second user equipment obtains a second MBMS SAI set from a SIB15 of a camping cell of the second user equipment.

The SIB15 includes a list of MBMS SATs for the current frequency (List of MBMS SAIs for the Current Frequeny) of the camping cell of the second user equipment. Each SAI in the list identifies an MBMS service area to which the camping cell of the second user equipment belongs. After receiving and parsing the SIB15, the second user equipment uses SAIs in the list as the second MBMS SAI set.

604. The second user equipment sends a second response message to the first user equipment when the first MBMS SAI set includes at least one SAI in the second MBMS SAI set.

The second response message is used to indicate that the second user equipment can provide the first user equipment with a relay service for the first MBMS.

The first MBMS SAI set includes at least one SAI in the second MBMS SAI set, that is, there is an intersection set between the first MBMS SAI set and the second MBMS SAI set. It means that the camping cell of the second user equipment provides the first MBMS, and the second user equipment can provide the first user equipment with the relay service for the first MBMS. In this case, the second user equipment sends the second response message to the first user equipment.

If there is no intersection set between the first MBMS SAI set and the second MBMS SAI set, it means that the camping cell of the second user equipment does not provide the first MBMS, and the second user equipment cannot provide the first user equipment with the relay service for the first MBMS. In this case, the second user equipment does not send the second response message to the first user equipment. For example, the second user equipment does not respond to the third request message, or sends a message for refusing to provide the relay service.

Optionally, in a specific application scenario, the USD of the first user equipment includes description information of multiple MBMSs provided by the group communication application server for the first user equipment. The first user equipment uses SAIs corresponding to the multiple MBMSs included in the USD as the first MBMS SAI set, and sends the first MBMS SAI set to the second user equipment. When the first MBMS SAI set includes at least one SAI in the second MBMS SAI set, the second user equipment sends the second response message to the first user equipment. The second response message includes the intersection set between the first MBMS SAI set and the second MBMS SAI set, and an SAI included in the intersection set identifies a service area of at least one MBMS that includes the first MBMS. That is, the second user equipment can provide the first user equipment with relay services for multiple MBMSs that include the first MBMS.

605. The first user equipment sends a first request message to the second user equipment.

The first request message is used to request the second user equipment to provide the first user equipment with the relay service for the first MBMS.

Optionally, with reference to step 604, when the second user equipment can provide the first user equipment with the relay services for the multiple MBMSs that include the first MBMS, the second response message includes the intersection set between the first MBMS SAI set and the second MBMS SAI set.

In this case, after receiving the second response message, the first user equipment determines that the second user equipment can provide the first user equipment with a relay service for at least one MBMS that includes the first MBMS, and requests the relay service for the at least one MBMS from the second user equipment.

In the USD of the first user equipment, each of different MBMSs corresponds to at least one SAI, and the different MBMSs are identified by using different TMGI identities. The first user equipment performs determining after receiving the second response message. If an SAI corresponding to an MBMS is included in the intersection set between the first MBMS SAI set and the second MBMS SAI set, it means that the second user equipment can provide a relay service for the MBMS. The first user equipment may send at least one TMGI monitoring request message to the second user equipment, and request a relay service for at least one MBMS from the second user equipment. The at least one TMGI monitoring request message includes different TMGIs that identify different MBMSs.

606. The second user equipment sends a first response message to the first user equipment.

The first response message is used to instruct the first user equipment to receive service data of the first MBMS from the second user equipment.

For a specific process in which the second user equipment provides the relay service for the first user equipment and sends the service data of the first MBMS to the first user equipment, refer to the embodiment corresponding to FIG. 3. Details are not described herein again.

With reference to step 602 to step 606, the first user equipment sends the first MBMS SAI set to the second user equipment by using the third request message, and after receiving the second response message, sends the first request message to the second user equipment to request the second user equipment to provide the relay service.

In a specific application scenario, the third request message further includes the first TMGI, and the first TMGI is used to identify the first MBMS. After receiving the third request message, if the first MBMS SAI set includes at least one SAI in the second MBMS SAI set, the second user equipment determines to provide the relay service for the first user equipment. In addition, because the third request message includes the first TMGI, the second user equipment may immediately start to monitor the service data of the first MBMS.

After being triggered to perform monitoring, the second user equipment sends the second response message to the first user equipment, so as to instruct the first user equipment to receive the service data of the first MBMS from the second user equipment. The second response message includes a MAC address. When detecting the service data of the first MBMS, the second user equipment sends the service data of the first MBMS to the first user equipment by using the MAC address carried in the second response message.

After determining to provide the relay service for the first user equipment, the second user equipment is triggered by the first TMGI to perform the monitoring, and instructs the first user equipment to receive the service data of the first MBMS. Therefore, signaling exchanges are reduced, and service efficiency for the first user equipment is further enhanced.

In the communication method for requesting a relay service according to this embodiment of the present disclosure, first user equipment obtains a first MBMS SAI set, and sends the first MBMS SAI set to second user equipment by using a third request message. The second user equipment obtains a second MBMS SAI set from a system information block SIB15 of a camping cell of the second user equipment, and the second user equipment sends a second response message to the first user equipment when there is an intersection set between the first MBMS SAI set and the second MBMS SAI set, so as to indicate that the second user equipment can provide the first user equipment with a relay service for a first MBMS. After it is determined that the second user equipment can provide the first user equipment with the relay service for the first MBMS, the first user equipment requests to obtain the relay service from the second user equipment. In this way, randomly selecting relay user equipment by the first user equipment is avoided, and the first user equipment can select appropriate relay user equipment that provides the relay service for the first MBMS. Therefore, service efficiency for the first user equipment is enhanced, and user satisfaction with a service is improved.

Figure 7:
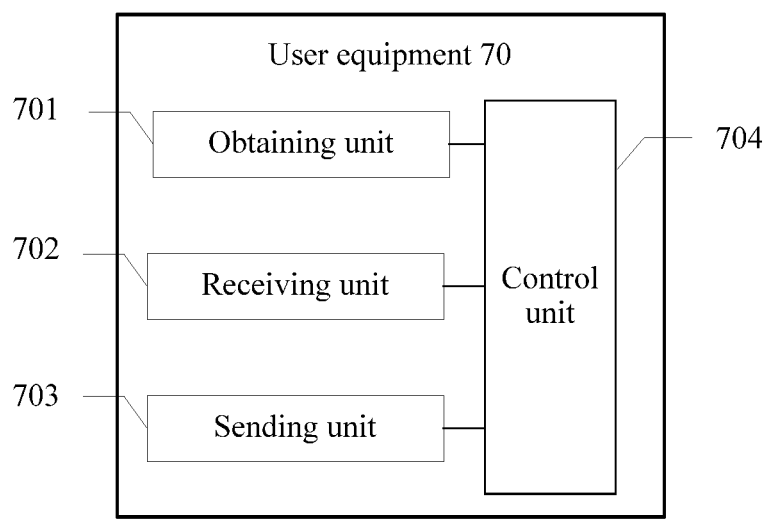
FIG. 7 is a schematic structural diagram of user equipment according to an embodiment of the present disclosure.

Based on the embodiment corresponding to FIG. 1, an embodiment of the present disclosure provides user equipment 70, configured to execute related operations of the first user equipment in the embodiment corresponding to FIG. 1. Referring to FIG. 7, the user equipment 70 includes: an obtaining unit 701, configured to obtain a first multimedia broadcast/multicast service service area identity MBMS SAI set, and send the first MBMS SAI set to a control unit 704, where the first MBMS SAI set is an MBMS SAI set of an MBMS service area of a first multimedia broadcast/multicast service MBMS, and the first MBMS is an MBMS provided by a group communication application server for the first user equipment; a receiving unit 702, configured to receive a second MBMS SAI set sent by second user equipment, and send the second MBMS SAI set to the control unit 704, where the second MBMS SAI set is an MBMS SAI set to which a camping cell of the second user equipment belongs; and a sending unit 703, configured to send a first request message to the second user equipment when the control unit 704 determines that the first MBMS SAI set includes at least one SAI in the second MBMS SAI set, where the first request message is used to request the second user equipment to provide the first user equipment with a relay service for the first MBMS.

Optionally, the obtaining unit 701 is specifically configured to: obtain user service description USD of the first user equipment from the group communication application server, where the USD of the first user equipment includes description information of the MBMS provided by the group communication application server for the first user equipment; and use an SAI set that is in the USD of the first user equipment and corresponding to a first temporary mobile group identity TMGI as the first MBMS SAI set, where the first TMGI is used to identify the first MBMS.

Optionally, the first request message is a TMGI monitoring request message, and the TMGI monitoring request message includes the first TMGI.

Optionally, the sending unit 703 is further configured to send a second request message to the second user equipment, where the second request message is used to request to obtain the second MBMS SAI set.

Optionally, the receiving unit 702 is further configured to receive a first response message from the second user equipment, where the first response message is used to instruct the first user equipment to receive service data of the first MBMS from the second user equipment.

The user equipment provided by this embodiment of the present disclosure obtains a first MBMS SAI set and a second MBMS SAI set, and when determining that a camping cell of second user equipment is within coverage of an MBMS service area of a first MBMS, requests the second user equipment to provide the user equipment with a relay service for the first MBMS. In this way, randomly selecting relay user equipment by the user equipment is avoided, and the user equipment can select appropriate relay user equipment that provides the relay service for the first MBMS. Therefore, service efficiency for the user equipment is enhanced, and user satisfaction with a service is improved.

Figure 8:
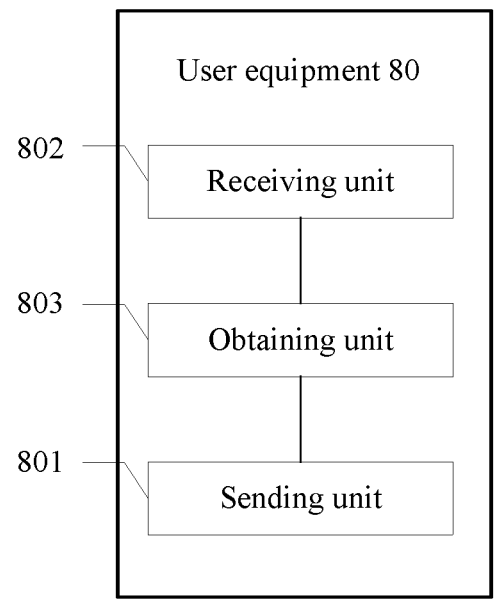
FIG. 8 is a schematic structural diagram of other user equipment according to an embodiment of the present disclosure.

Based on the embodiment corresponding to FIG. 2, an embodiment of the present disclosure provides other user equipment 80, configured to execute related operations of the second user equipment in the embodiment corresponding to FIG. 2. Referring to FIG. 8, the user equipment 80 includes: a sending unit 801, configured to send a second multimedia broadcast/multicast service service area identity MBMS SAI set to first user equipment, so that the first user equipment determines, according to the second MBMS SAI set and a first MBMS SAI set, whether the second user equipment can provide the first user equipment with a relay service for a first multimedia broadcast/multicast service MBMS, where the second MBMS SAI set is an MBMS SAI set to which a camping cell of the second user equipment belongs, the first MBMS SAI set is an MBMS SAI set of an MBMS service area of the first MBMS, and the first MBMS is an MBMS provided by a group communication application server for the first user equipment; and a receiving unit 802, configured to receive a first request message sent by the first user equipment, where the first request message is used to request the second user equipment to provide the first user equipment with the relay service for the first MBMS.

Optionally, the receiving unit 802 is further configured to receive a system information block SIB15 of the camping cell of the second user equipment.

The user equipment 80 further includes an obtaining unit 803, configured to obtain the second MBMS SAI set from the system information block SIB15 of the camping cell of the second user equipment that is received by the receiving unit 802.

Optionally, the receiving unit 802 is further configured to receive a second request message sent by the first user equipment, where the second request message is used to request to obtain the second MBMS SAI set.

Optionally, the sending unit 801 is further configured to send a first response message to the first user equipment, where the first response message is used to instruct the first user equipment to receive service data of the first MBMS from the second user equipment.

The user equipment provided by this embodiment of the present disclosure sends a second MBMS SAI set to first user equipment, so that the first user equipment requests a relay service for a first MBMS from the user equipment after determining that the user equipment can be used as relay user equipment. In this way, randomly selecting relay user equipment by the first user equipment is avoided, and the first user equipment can select appropriate relay user equipment that provides the relay service for the first MBMS. Therefore, service efficiency for the first user equipment is enhanced, and user satisfaction with a service is improved.

Figure 9:
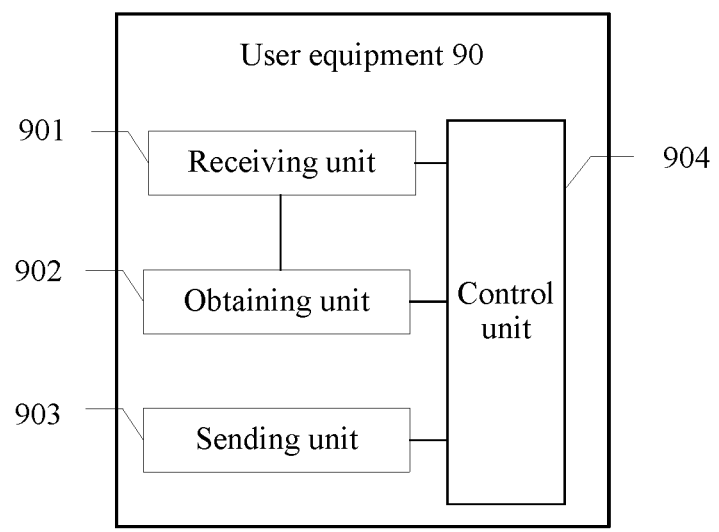
FIG. 9 is a schematic structural diagram of user equipment according to another embodiment of the present disclosure.

Based on the embodiment corresponding to FIG. 4, another embodiment of the present disclosure provides user equipment 90, configured to execute related operations of the second user equipment in the embodiment corresponding to FIG. 4. Referring to FIG. 9, the user equipment 90 includes: a receiving unit 901, configured to receive a third request message sent by first user equipment, and send the third request message to a control unit 904, where the third request message includes a first multimedia broadcast/multicast service service area identity MBMS SAI set, the first MBMS SAI set is an MBMS SAI set of an MBMS service area of a first multimedia broadcast/multicast service MBMS, and the first MBMS is an MBMS provided by a group communication application server for the first user equipment; an obtaining unit 902, configured to obtain a second MBMS SAI set, and send the second MBMS SAI set to the control unit 904, where the second MBMS SAI set is an MBMS SAI set to which a camping cell of the second user equipment belongs; and a sending unit 903, configured to send a second response message to the first user equipment when the control unit 904 determines that the first MBMS SAI set includes at least one SAI in the second MBMS SAI set, where the second response message is used to indicate that the second user equipment can provide the first user equipment with a relay service for the first MBMS.

Optionally, the receiving unit 901 is further configured to receive a system information block SIB15 of the camping cell of the second user equipment.

The obtaining unit 902 is specifically configured to obtain the second MBMS SAI set from the system information block SIB15 of the camping cell of the second user equipment that is received by the receiving unit 901.

Optionally, the second response message includes an intersection set between the first MBMS SAI set and the second MBMS SAI set.

Optionally, the receiving unit 901 is further configured to receive a first request message sent by the first user equipment, where the first request message is used to request the second user equipment to provide the first user equipment with the relay service for the first MBMS.

The sending unit 903 is further configured to send a first response message to the first user equipment, where the first response message is used to instruct the first user equipment to receive service data of the first MBMS from the second user equipment.

Optionally, the third request message further includes a first TMGI, and the first TMGI is used to identify the first MBMS.

The second response message is further used to instruct the first user equipment to receive service data of the first MBMS from the second user equipment.

In the communication method for requesting a relay service according to this embodiment of the present disclosure, the user equipment receives a third request message that includes a first MBMS SAI set and that is sent by first user equipment, obtains a second MBMS SAI set from a system information block SIB15 of a camping cell of the user equipment, and when the first MBMS SAI set includes at least one SAI in the second MBMS SAI set, notifies, by using a second response message, the first user equipment that the user equipment can provide the first user equipment with a relay service for a first MBMS. In this way, randomly selecting relay user equipment by the first user equipment is avoided, and the first user equipment can select appropriate relay user equipment that provides the relay service for the first MBMS. Therefore, service efficiency for the first user equipment is enhanced, and user satisfaction with a service is improved.

Figure 10:
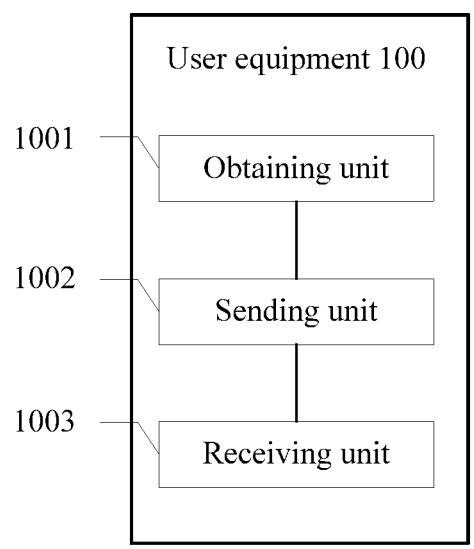
FIG. 10 is a schematic structural diagram of other user equipment according to another embodiment of the present disclosure.

Based on the embodiment corresponding to FIG. 5, another embodiment of the present disclosure provides other user equipment 100, configured to execute related operations of the first user equipment in the embodiment corresponding to FIG. 5. Referring to FIG. 10, the user equipment 100 includes: an obtaining unit 1001, configured to obtain a first multimedia broadcast/multicast service service area identity MBMS SAI set, where the first MBMS SAI set is an MBMS SAI set of an MBMS service area of a first multimedia broadcast/multicast service MBMS, and the first MBMS is an MBMS provided by a group communication application server for the first user equipment; a sending unit 1002, configured to send a third request message to second user equipment, where the third request message includes the first MBMS SAI set obtained by the obtaining unit 1001; and a receiving unit 1003, configured to receive a second response message sent by the second user equipment, where the second response message is used to indicate that the second user equipment can provide the first user equipment with a relay service for the first MBMS.

Optionally, the obtaining unit 1001 is specifically configured to: obtain user service description USD of the first user equipment from the group communication application server, where the USD of the first user equipment includes description information of the MBMS provided by the group communication application server for the first user equipment; and use an SAI set that is in the USD of the first user equipment and corresponding to a first temporary mobile group identity TMGI as the first MBMS SAI set, where the first TMGI is used to identify the first MBMS.

Optionally, the second response message includes an intersection set between the first MBMS SAI set and a second MBMS SAI set. The second MBMS SAI set is an MBMS SAI set to which a camping cell of the second user equipment belongs.

Optionally, the sending unit 1002 is further configured to send a first request message to the second user equipment, where the first request message is used to request the second user equipment to provide the first user equipment with the relay service for the first MBMS.

The receiving unit 1003 is further configured to receive a first response message sent by the second user equipment, where the first response message is used to instruct the first user equipment to receive service data of the first MBMS from the second user equipment.

The user equipment provided by this embodiment of the present disclosure obtains a first MBMS SAI set, and sends the first MBMS SAI set to second user equipment, so that the second user equipment determines whether the second user equipment can provide the first user equipment with a relay service for a first MBMS. In this way, randomly selecting relay user equipment is avoided, and the user equipment can select appropriate relay user equipment that provides the relay service for the first MBMS. Therefore, service efficiency for the user equipment is enhanced, and user satisfaction with a service is improved.

Figure 11:
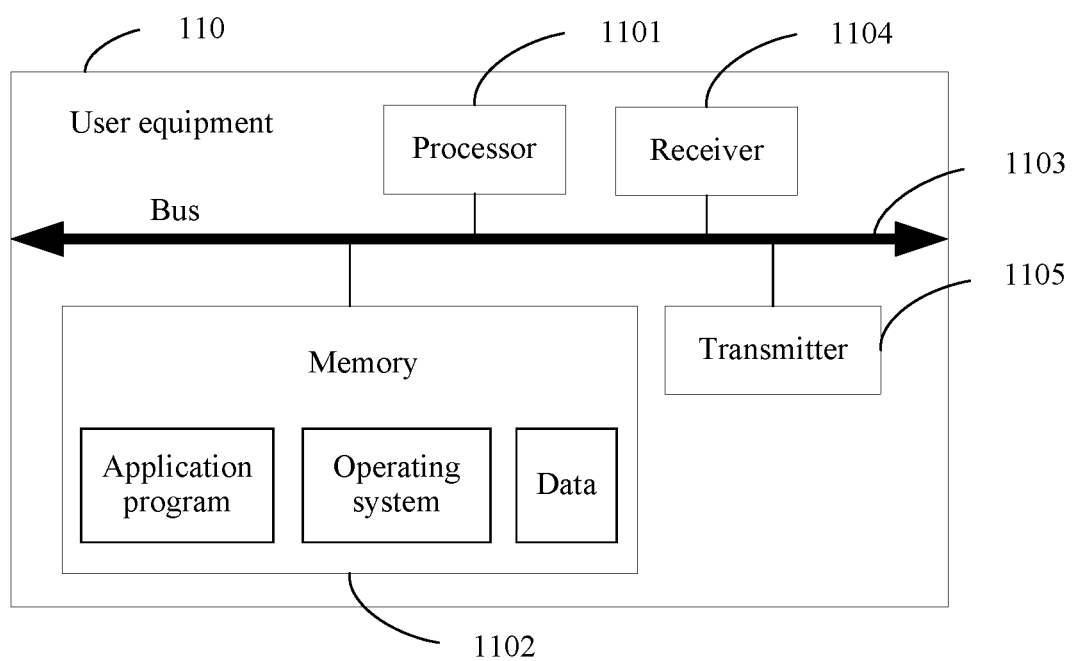
FIG. 11 is a schematic structural diagram of still other user equipment according to an embodiment of the present disclosure.

Based on the embodiment corresponding to FIG. 1, an embodiment of the present disclosure provides still other user equipment 110, configured to execute related operations of the first user equipment in the embodiment corresponding to FIG. 1. Referring to FIG. 11, the user equipment no includes: a processor 1101, a memory 1102, a transmitter 1105, a receiver 1104, and a bus 1103, where the processor 1101, the memory 1102, the transmitter 1105, the receiver 1104, and the memory 1102 are connected to each other by using the bus 1103.

The processor 1101 is configured to obtain a first multimedia broadcast/multicast service service area identity MBMS SAI set, where the first MBMS SAI set is an MBMS SAI set of an MBMS service area of a first multimedia broadcast/multicast service MBMS, and the first MBMS is an MBMS provided by a group communication application server for the first user equipment.

The receiver 1104 is configured to receive a second MBMS SAI set sent by second user equipment, where the second MBMS SAI set is an MBMS SAI set to which a camping cell of the second user equipment belongs.

The transmitter 1105 is configured to send a first request message to the second user equipment when the processor 1101 determines that the first MBMS SAI set includes at least one SAI in the second MBMS SAI set, where the first request message is used to request the second user equipment to provide the first user equipment with a relay service for the first MBMS.

Optionally, the processor 1101 is specifically configured to: obtain user service description USD of the first user equipment from the group communication application server, where the USD of the first user equipment includes description information of the MBMS provided by the group communication application server for the first user equipment; and use an SAI set that is in the USD of the first user equipment and corresponding to a first temporary mobile group identity TMGI as the first MBMS SAI set, where the first TMGI is used to identify the first MBMS.

Optionally, the first request message is a TMGI monitoring request message, and the TMGI monitoring request message includes the first TMGI.

Optionally, the transmitter 1105 is further configured to send a second request message to the second user equipment, where the second request message is used to request to obtain the second MBMS SAI set.

Optionally, the receiver 1104 is further configured to receive a first response message from the second user equipment, where the first response message is used to instruct the first user equipment to receive service data of the first MBMS from the second user equipment.

The user equipment provided by this embodiment of the present disclosure obtains a first MBMS SAI set and a second MBMS SAI set, and when determining that a camping cell of second user equipment is within coverage of an MBMS service area of a first MBMS, requests the second user equipment to provide the user equipment with a relay service for the first MBMS. In this way, randomly selecting relay user equipment by the user equipment is avoided, and the user equipment can select appropriate relay user equipment that provides the relay service for the first MBMS. Therefore, service efficiency for the user equipment is enhanced, and user satisfaction with a service is improved.

Figure 12:
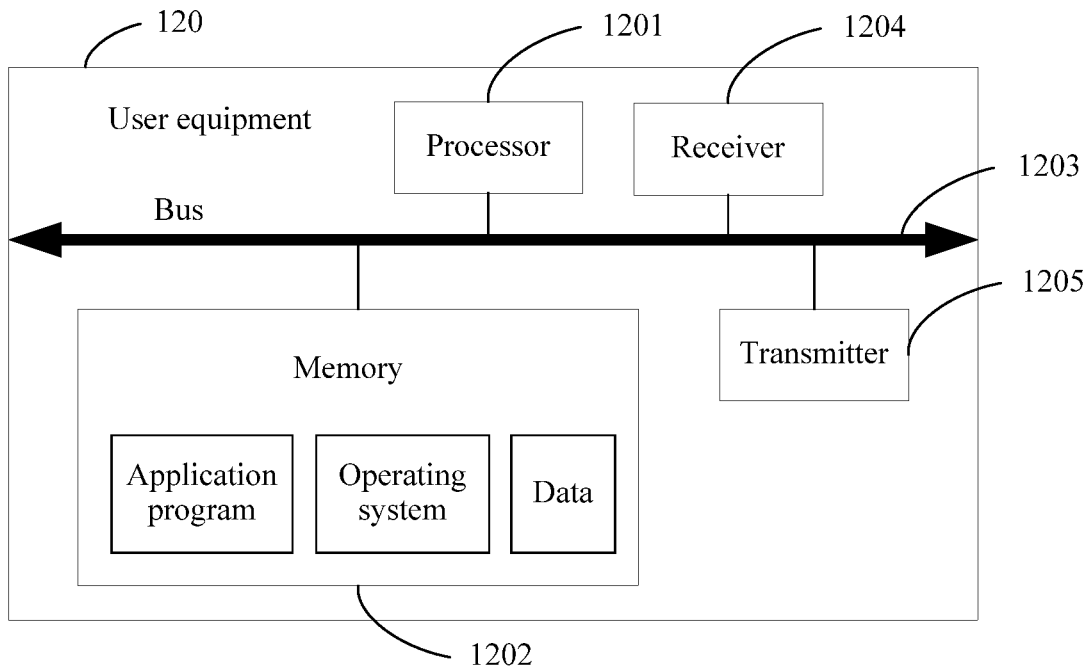
FIG. 12 is a schematic structural diagram of yet other user equipment according to an embodiment of the present disclosure.

Based on the embodiment corresponding to FIG. 2, an embodiment of the present disclosure provides yet other user equipment 120, configured to execute related operations of the first user equipment in the embodiment corresponding to FIG. 2. Referring to FIG. 12, the user equipment 120 includes: a processor 1201, a memory 1202, a transmitter 1205, a receiver 1204, and a bus 1203, where the processor 1201, the memory 1202, the transmitter 1205, the receiver 1204, and the memory 1202 are connected to each other by using the bus 1203.

The transmitter 1205 is configured to send a second multimedia broadcast/multicast service service area identity MBMS SAI set to first user equipment, so that the first user equipment determines, according to the second MBMS SAI set and a first MBMS SAI set, whether the second user equipment can provide the first user equipment with a relay service for a first multimedia broadcast/multicast service MBMS, where the second MBMS SAI set is an MBMS SAI set to which a camping cell of the second user equipment belongs, the first MBMS SAI set is an MBMS SAI set of an MBMS service area of the first MBMS, and the first MBMS is an MBMS provided by a group communication application server for the first user equipment.

The receiver 1204 is configured to receive a first request message sent by the first user equipment, where the first request message is used to request the second user equipment to provide the first user equipment with the relay service for the first MBMS.

Optionally, the receiver 1204 is further configured to receive a system information block SIB15 of the camping cell of the second user equipment.

The processor 1201 is configured to obtain the second MBMS SAI set from the system information block SIB15 of the camping cell of the second user equipment that is received by the receiving unit.

Optionally, the receiver 1204 is further configured to receive a second request message sent by the first user equipment, where the second request message is used to request to obtain the second MBMS SAI set.

Optionally, the transmitter 1205 is further configured to send a first response message to the first user equipment, where the first response message is used to instruct the first user equipment to receive service data of the first MBMS from the second user equipment.

The user equipment provided by this embodiment of the present disclosure sends a second MBMS SAI set to first user equipment, so that the first user equipment requests a relay service for a first MBMS from the user equipment after determining that the user equipment can be used as relay user equipment. In this way, randomly selecting relay user equipment by the first user equipment is avoided, and the first user equipment can select appropriate relay user equipment that provides the relay service for the first MBMS. Therefore, service efficiency for the first user equipment is enhanced, and user satisfaction with a service is improved.

Figure 13:
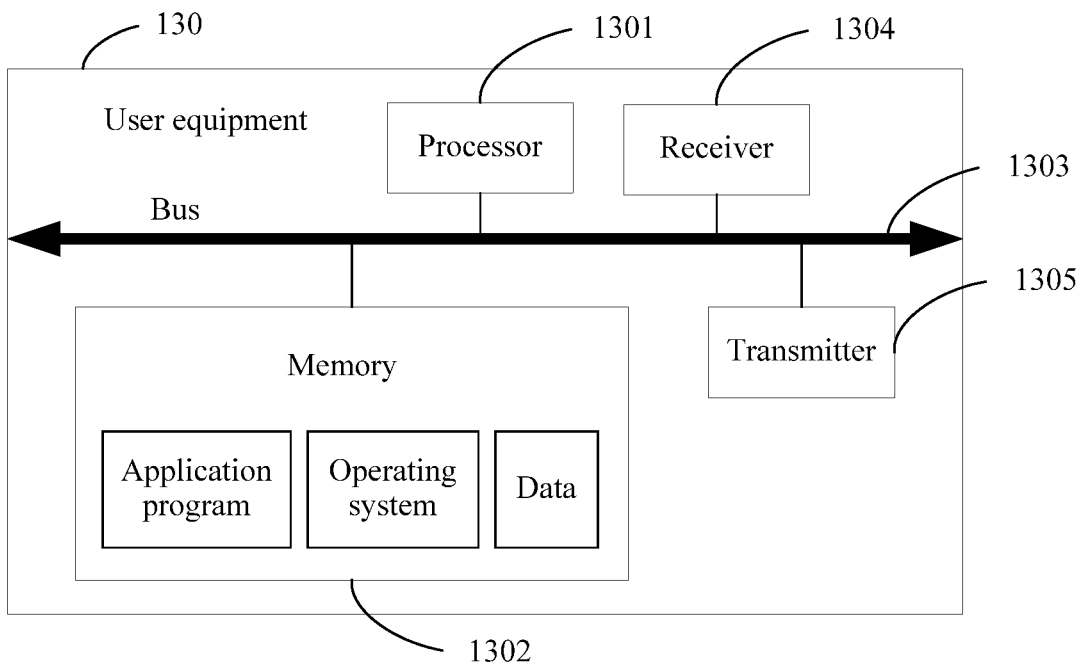
FIG. 13 is a schematic structural diagram of still other user equipment according to another embodiment of the present disclosure.

Based on the embodiment corresponding to FIG. 4, another embodiment of the present disclosure provides still other user equipment 130, configured to execute related operations of the first user equipment in the embodiment corresponding to FIG. 4. Referring to FIG. 13, the user equipment 130 includes: a processor 1301, a memory 1302, a transmitter 1305, a receiver 1304, and a bus 1303, where the processor 1301, the memory 1302, the transmitter 1305, the receiver 1304, and the memory 1302 are connected to each other by using the bus 1303.

The receiver 1304 is configured to receive a third request message sent by first user equipment, where the third request message includes a first multimedia broadcast/multicast service service area identity MBMS SAI set, the first MBMS SAI set is an MBMS SAI set of an MBMS service area of a first multimedia broadcast/multicast service MBMS, and the first MBMS is an MBMS provided by a group communication application server for the first user equipment.

The processor 1301 is configured to obtain a second MBMS SAI set, where the second MBMS SAI set is an MBMS SAI set to which a camping cell of the second user equipment belongs.

The transmitter 1305 is configured to send a second response message to the first user equipment when the processor 1301 determines that the first MBMS SAI set includes at least one SAI in the second MBMS SAI set, where the second response message is used to indicate that the second user equipment can provide the first user equipment with a relay service for the first MBMS.

Optionally, the receiver 1304 is further configured to receive a system information block SIB15 of the camping cell of the second user equipment.

The processor 1301 is further configured to obtain the second MBMS SAI set from the system information block SIB15 of the camping cell of the second user equipment that is received by the receiver 1304.

Optionally, the second response message includes an intersection set between the first MBMS SAI set and the second MBMS SAI set.

Optionally, the receiver 1304 is further configured to receive a first request message sent by the first user equipment, where the first request message is used to request the second user equipment to provide the first user equipment with the relay service for the first MBMS.

The transmitter 1305 is further configured to send a first response message to the first user equipment, where the first response message is used to instruct the first user equipment to receive service data of the first MBMS from the second user equipment.

Optionally, the third request message further includes a first TMGI, and the first TMGI is used to identify the first MBMS.

The second response message is further used to instruct the first user equipment to receive service data of the first MBMS from the second user equipment.

In the communication method for requesting a relay service according to this embodiment of the present disclosure, the user equipment receives a third request message that includes a first MBMS SAI set and that is sent by first user equipment, obtains a second MBMS SAI set from a system information block SIB15 of a camping cell of the user equipment, and when the first MBMS SAI set includes at least one SAI in the second MBMS SAI set, notifies, by using a second response message, the first user equipment that the user equipment can provide the first user equipment with a relay service for a first MBMS. In this way, randomly selecting relay user equipment by the first user equipment is avoided, and the first user equipment can select appropriate relay user equipment that provides the relay service for the first MBMS. Therefore, service efficiency for the first user equipment is enhanced, and user satisfaction with a service is improved.

Figure 14:
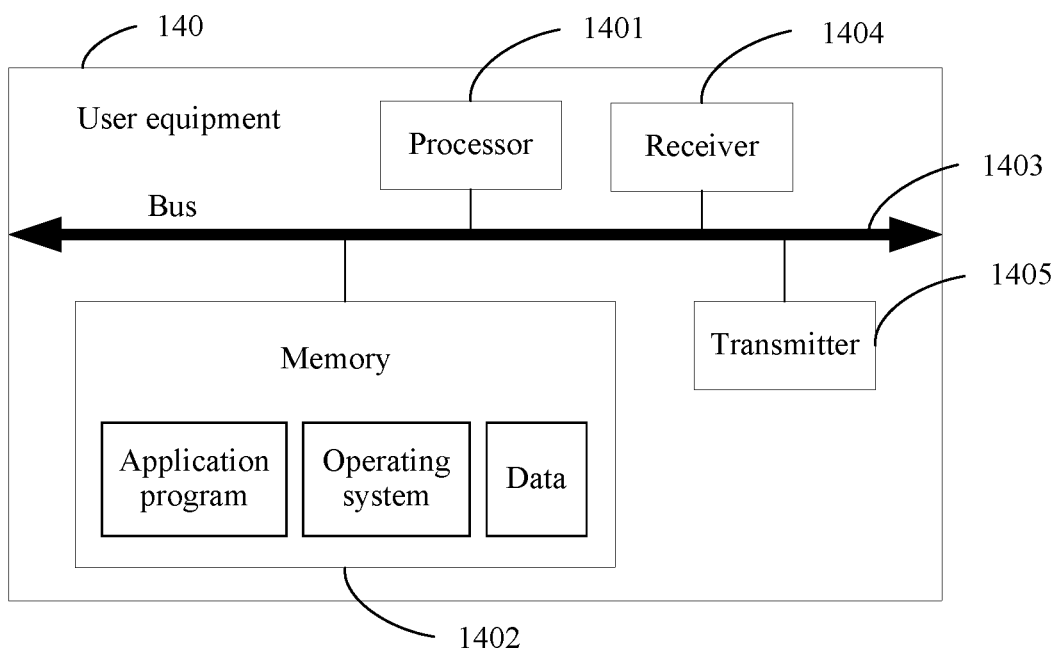
FIG. 14 is a schematic structural diagram of yet other user equipment according to another embodiment of the present disclosure.

Based on the embodiment corresponding to FIG. 5, another embodiment of the present disclosure provides yet other user equipment 140, configured to execute related operations of the first user equipment in the embodiment corresponding to FIG. 5. Referring to FIG. 14, the user equipment 140 includes: a processor 1401, a memory 1402, a transmitter 1405, a receiver 1404, and a bus 1403, where the processor 1401, the memory 1402, the transmitter 1405, the receiver 1404, and the memory 1402 are connected to each other by using the bus 1403.

The processor 1401 is configured to obtain a first multimedia broadcast/multicast service service area identity MBMS SAI set, where the first MBMS SAI set is an MBMS SAI set of an MBMS service area of a first multimedia broadcast/multicast service MBMS, and the first MBMS is an MBMS provided by a group communication application server for the first user equipment.

The transmitter 1405 is configured to send a third request message to second user equipment, where the third request message includes the first MBMS SAI set obtained by the obtaining unit.

The receiver 1404 is configured to receive a second response message sent by the second user equipment, where the second response message is used to indicate that the second user equipment can provide the first user equipment with a relay service for the first MBMS.

Optionally, the processor 1401 is specifically configured to: obtain user service description USD of the first user equipment from the group communication application server, where the USD of the first user equipment includes description information of the MBMS provided by the group communication application server for the first user equipment; and use an SAI set that is in the USD of the first user equipment and corresponding to a first temporary mobile group identity TMGI as the first MBMS SAI set, where the first TMGI is used to identify the first MBMS.

Optionally, the second response message includes an intersection set between the first MBMS SAI set and the second MBMS SAI set. The second MBMS SAI set is an MBMS SAI set to which a camping cell of the second user equipment belongs.

Optionally, the transmitter 1405 is further configured to send a first request message to the second user equipment, where the first request message is used to request the second user equipment to provide the first user equipment with the relay service for the first MBMS.

The receiver 1404 is further configured to receive a first response message sent by the second user equipment, where the first response message is used to instruct the first user equipment to receive service data of the first MBMS from the second user equipment.

The user equipment provided by this embodiment of the present disclosure obtains a first MBMS SAI set, and sends the first MBMS SAI set to second user equipment, so that the second user equipment determines whether the second user equipment can provide the first user equipment with a relay service for a first MBMS. In this way, randomly selecting relay user equipment is avoided, and the user equipment can select appropriate relay user equipment that provides the relay service for the first MBMS. Therefore, service efficiency for the user equipment is enhanced, and user satisfaction with a service is improved.

Figure 15:
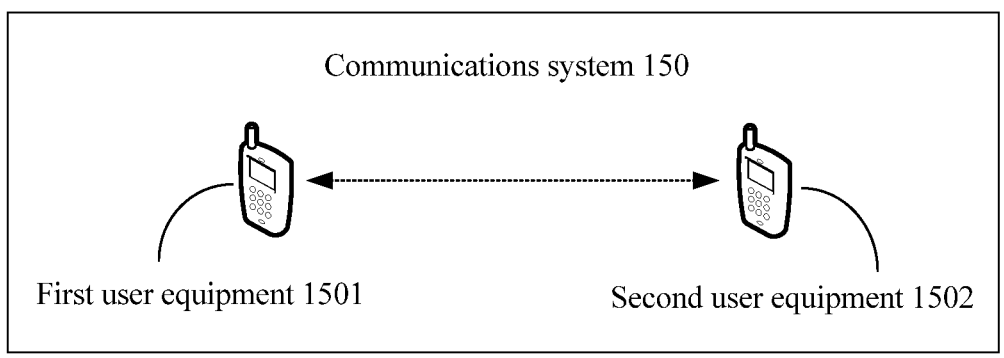
FIG. 15 is a schematic diagram of a communications system according to an embodiment of the disclosure.

Based on the embodiments corresponding to FIG. 7 to FIG. 14, an embodiment of the present disclosure provides a communications system 150. As shown in FIG. 15, the communications system 150 includes first user equipment 1501 and second user equipment 1502; where the first user equipment 1501 is the user equipment described in the embodiment corresponding to FIG. 7, and the second user equipment 1502 is the user equipment described in the embodiment corresponding to FIG. 8; or the first user equipment 1501 is the user equipment described in the embodiment corresponding to FIG. 10, and the second user equipment 1502 is the user equipment described in the embodiment corresponding to FIG. 9; or the first user equipment 1501 is the user equipment described in the embodiment corresponding to FIG. 11, and the second user equipment 1502 is the user equipment described in the embodiment corresponding to FIG. 12; or the first user equipment 1501 is the user equipment described in the embodiment corresponding to FIG. 14, and the second user equipment 1502 is the user equipment described in the embodiment corresponding to FIG. 13.

In the communications system provided in this embodiment of the present disclosure, first user equipment or second user equipment compares a first MBMS SAI set with a second MBMS SAI set, and when the first MBMS SAI set includes at least one SAI in the second MBMS SAI set, determines that the second user equipment can be used as relay user equipment to provide the first user equipment with a relay service for a first MBMS.

The first user equipment requests the relay service from the second user equipment after determining that the second user equipment can be used as relay user equipment. In this way, randomly selecting relay user equipment is avoided, and the first user equipment can select appropriate relay user equipment that provides the relay service for the first MBMS. Therefore, service efficiency for the first user equipment is enhanced, and user satisfaction with a service is improved.

With descriptions of the foregoing embodiments, persons skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a computer. The following is taken as an example but not for limitation: The computer readable medium may include a RAM (random access memory), a ROM (read-only memory), an EEPROM (electrically erasable programmable read-only memory), a CD-ROM (compact disc read-only memory) or another optical disk storage or disk storage medium or another disk storage device, or any another medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a DSL (digital subscriber line) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and a disc used by the present disclosure include a CD (compact disc), a laser disc, an optical disc, a DVD disc (digital versatile disc), a floppy disk and a Blu-ray disc. The disk generally copies data by a magnetic means, and the disc copies data optically by a laser means. The foregoing combination should also be included in the protection scope of the computer-readable medium.

The foregoing descriptions are merely specific implementation manners of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
receiving, by first user equipment (UE), a first request message from a second UE, wherein the first request message comprises a first multimedia broadcast/multicast service service area identity (MBMS SAT) set, wherein the first MBMS SAI set comprises a first MBMS SAT, wherein the first MBMS SAI identifies a first multimedia broadcast/multicast service (MBMS) service area, wherein the first MBMS service area is a service area of a first MBMS, and the first MBMS is provided by a group communication application server for the second UE;
obtaining, by the first UE, a second MBMS SAI set, wherein the second MBMS SAI set comprises a second MBMS SAT, wherein the second MBMS SAI identifies a second MBMS service area, wherein a camping cell of the first UE belongs to the second MBMS service area, and wherein the first MBMS SAI and the second MBMS SAI are the same or different, and the first MBMS service area and the second MBMS service area are the same or different;
determining, by the first UE, whether the second MBMS SAI set comprises a SAI existing in the first MBMS SAI set;
sending, by the first UE, a first response message to the second UE in response to determining the second MBMS SAI set comprises a SAI in the first MBMS SAI set, wherein the first response message indicates that the first UE is configured to provide the second UE with a relay service for the first MBMS;
determining, by the first UE, not to send a first response message to the second UE in response to determining the second MBMS SAI set does not comprise a SAI in the first MBMS SAI set;
receiving, by the first UE, a second request message sent from the second UE in response to the first UE sending the first response message, wherein the second request message requests the first UE to provide the second UE with the relay service for the first MBMS; and
sending, by the first UE, in response to receiving the second request message, a second response message to the second UE, wherein the second response message instructs the second UE to receive service data of the first MBMS from the first UE, and the second response message includes monitoring duration information that indicates a duration in which the first UE will monitor the first MBMS for the second UE.

2. The method according to claim 1, wherein the second MBMS SAI set is obtained from a system information block (SIB) of the camping cell of the second UE.

3. The method according to claim 1, wherein the first response message comprises an intersection set between the first MBMS SAI set and the second MBMS SAI set.

4. The method according to claim 1, wherein the first request message further comprises a first temporary mobile group identity (TMGI), and the first TMGI identifies the first MBMS, and wherein the first response message further instructs the second UE to receive service data of the first MBMS from the first UE.

5. User equipment (UE), comprising:
a transmitter;
a receiver;
a non-transitory memory storage comprising instructions; and
one or more processors in communication with the transmitter, the receiver and the memory storage, wherein the UE is configured to be used as a first UE, and the one or more processors are configured to execute the instructions to:
receive, through the receiver, a first request message from a second UE, wherein the first request message comprises a first multimedia broadcast/multicast service service area identity (MBMS SAT) set, wherein the first MBMS SAI set comprises a first MBMS SAT, wherein the first MBMS SAI identifies an first multimedia broadcast/multicast service (MBMS) service area, wherein the first MBMS service area is a service area of a first MBMS, and the first MBMS is provided by a group communication application server for the second UE;
obtain a second MBMS SAI set, wherein the second MBMS SAI set comprises a second MBMS SAT, wherein the second MBMS SAI identifies an second MBMS service area, wherein a camping cell of the first UE belongs to the second MBMS service area, and wherein the first MBMS SAI and the second MBMS SAI are the same or different, and the first MBMS service area and the second MBMS service area are the same or different;
determine whether the second MBMS SAI set comprises a SAI existing in the first MBMS SAI set;
send, through the transmitter, a first response message to the second UE in response to determining the second MBMS SAI set comprises a SAI in the first MBMS SAI set, wherein the first response message indicates that the first UE is configured to provide the second UE with a relay service for the first MBMS;
determine, by the first UE, not to send a first response message to the second UE in response to determining the second MBMS SAI set does not comprise a SAI in the first MBMS SAI set;
receive, through the receiver, a second request message sent from the second UE in response to the first UE sending the first response message, wherein the second request message requests the first UE to provide the second UE with the relay service for the first MBMS; and
send, through the transmitter, in response to the first UE sending the first response message, a second response message to the second UE, wherein the second response message instructs the second UE to receive service data of the first MBMS from the first UE, and the second response message includes monitoring duration information that indicates a duration in which the first UE will monitor the first MBMS for the second UE.

6. The UE according to claim 5, wherein the second MBMS SAI set is obtained from a system information block (SIB) of the camping cell of the second UE.

7. The UE according to claim 5, wherein the first response message comprises an intersection set between the first MBMS SAI set and the second MBMS SAI set.

8. The UE according to claim 5, wherein the first request message further comprises a first temporary mobile group identity (TMGI), and the first TMGI identifies the first MBMS, and wherein the first response message further instructs the second UE to receive service data of the first MBMS from the first UE.

9. A non-transitory computer-readable storage medium storing a program to be executed by a processor, the program including instructions for:
- receiving, by first user equipment (UE), a first request message from a second UE, wherein the first request message comprises a first multimedia broadcast/multicast service service area identity (MBMS SAT) set, wherein the first MBMS SAI set comprises a first MBMS SAT, wherein the first MBMS SAI identifies a first multimedia broadcast/multicast service (MBMS) service area, wherein the first MBMS service area is a service area of a first MBMS, and the first MBMS is provided by a group communication application server for the second UE;
- obtaining, by the first UE, a second MBMS SAI set, wherein the second MBMS SAI set comprises a second MBMS SAT, wherein the second MBMS SAI identifies a second MBMS service area, wherein a camping cell of the first UE belongs to the second MBMS service area, and wherein the first MBMS SAI and the second MBMS SAI are the same or different, and the first MBMS service area and the second MBMS service area are the same or different;
- determining, by the first UE, whether the second MBMS SAI set comprises a SAI existing in the first MBMS SAI set;
- sending, by the first UE, a first response message to the second UE in response to determining the second MBMS SAI set comprises a SAI in the first MBMS SAI set, wherein the first response message indicates that the first UE is configured to provide the second UE with a relay service for the first MBMS;
- determining, by the first UE, not to send a first response message to the second UE in response to determining the second MBMS SAI set does not comprise a SAI in the first MBMS SAI set;
- receiving, by the first UE, a second request message sent from the second UE in response to the first UE sending the first response message, wherein the second request message requests the first UE to provide the second UE with the relay service for the first MBMS; and
- sending, by the first UE, in response to receiving the second request message, a second response message to the second UE, wherein the second response message instructs the second UE to receive service data of the first MBMS from the first UE, and the second response message includes monitoring duration information that indicates a duration in which the first UE will monitor the first MBMS for the second UE.

10. The non-transitory computer-readable storage medium according to claim 9, wherein the second MBMS SAI set is obtained from a system information block (SIB) of the camping cell of the second UE.

11. The non-transitory computer-readable storage medium according to claim 9, wherein the first response message comprises an intersection set between the first MBMS SAI set and the second MBMS SAI set.

12. The non-transitory computer-readable storage medium according to claim 9, wherein the first request message further comprises a first temporary mobile group identity (TMGI), and the first TMGI identifies the first MBMS, and wherein the first response message further instructs the second UE to receive service data of the first MBMS from the first UE.

* * * * *

UNITED STATES PATENT AND TRADEMARK OFFICE
CERTIFICATE OF CORRECTION

PATENT NO. : 10,771,928 B2  
APPLICATION NO. : 15/720602  
DATED : September 8, 2020  
INVENTOR(S) : He et al.

Page 1 of 1

It is certified that error appears in the above-identified patent and that said Letters Patent is hereby corrected as shown below:

In the Claims

In Column 31, Line 17, Claim 1, delete "(MBMS SAT)" and insert --(MBMS SAI)--.

In Column 31, Line 19, Claim 1, delete "MBMS SAT" and insert --MBMS SAI--.

In Column 31, Line 27, Claim 1, delete "MBMS SAT" and insert --MBMS SAI--.

In Column 32, Line 18, Claim 5, delete "(MBMS SAT)" and insert --(MBMS SAI)--.

In Column 32, Line 20, Claim 5, delete "SAT" and insert --SAI--.

In Column 32, Line 27, Claim 5, delete "MBMS SAT" and insert --MBMS SAI--.

In Column 33, Line 13, Claim 9, delete "(MBMS SAT)" and insert --(MBMS SAI)--.

In Column 33, Line 15, Claim 9, delete "MBMS SAT" and insert --MBMS SAI--.

In Column 33, Line 23, Claim 9, delete "MBMS SAT" and insert --MBMS SAI--.

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*